United States Patent
Yamamoto et al.

(10) Patent No.: US 7,023,597 B2
(45) Date of Patent: Apr. 4, 2006

(54) OPTICAL SCANNING DEVICE, IMAGE READING DEVICE PROVIDED WITH THIS, IMAGE FORMING DEVICE, AND PHOTOGRAPHING DEVICE

(75) Inventors: Yoshiharu Yamamoto, Toyonaka (JP); Motonobu Yoshikawa, Osaka (JP); Daizaburo Matsuki, Neyagawa (JP); Hajime Yamamoto, Ikoma (JP); Masanori Yoshikawa, Neyagawa (JP); Akinobu Okuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 56 days.

(21) Appl. No.: 10/472,777

(22) PCT Filed: Apr. 10, 2002

(86) PCT No.: PCT/JP02/03567

§ 371 (c)(1), (2), (4) Date: Sep. 24, 2003

(87) PCT Pub. No.: WO02/084376

PCT Pub. Date: Oct. 24, 2002

(65) Prior Publication Data

US 2004/0100672 A1    May 27, 2004

(30) Foreign Application Priority Data

Apr. 11, 2001    (JP)    ............... 2001-112327

(51) Int. Cl.
*G02B 26/08*    (2006.01)
(52) U.S. Cl. ............... 359/208; 359/204; 359/216
(58) Field of Classification Search ........ 359/205–208, 359/216–219; 347/260–261
See application file for complete search history.

(56) References Cited

U.S. PATENT DOCUMENTS

| | | | |
|---|---|---|---|
| 5,353,047 A | 10/1994 | Nakamura et al. | |
| 5,426,298 A | 6/1995 | Sakuma et al. | |
| 5,504,613 A | 4/1996 | Itabashi et al. | |
| 5,583,559 A | 12/1996 | Nakamura et al. | |
| 5,805,323 A * | 9/1998 | Ichikawa | 359/205 |
| 5,930,019 A * | 7/1999 | Suzuki et al. | 359/204 |
| 5,963,355 A * | 10/1999 | Iizuka | 359/205 |

(Continued)

FOREIGN PATENT DOCUMENTS

JP    2-32874    2/1990

(Continued)

*Primary Examiner*—James Phan
(74) *Attorney, Agent, or Firm*—Hamre, Schumann, Mueller & Larson, P.C.

(57) ABSTRACT

An image reading device comprising a rotary polygon mirror (6) for scanning a light flux from a light source (1), an imaging optical system (4) for forming on a reflection plane of the mirror (6) a linear image larger than the width in a main scanning direction of the one reflection plane, and a curved-face mirror (7), wherein the light source (1), the imaging optical system (4), the rotary polygon mirror (6) and the curved-face mirror (7) are disposed in different positions in a sub-scanning direction, a light flux from the imaging optical system (4) shines obliquely onto the polygon mirror (6), and a light flux reflected off the mirror (6) beams obliquely onto the curved-face mirror (7). Since one curved-face mirror can beam a light flux reflected from the rotary polygon mirror onto a surface to be scanned and the rotary polygon mirror having a small inscribed radius and many reflection planes can be used, satisfactory optical performance and high-speed feature can be realized.

48 Claims, 19 Drawing Sheets

U.S. PATENT DOCUMENTS

| | | | |
|---|---|---|---|
| 6,075,636 A * | 6/2000 | Sekikawa | 359/204 |
| 6,091,533 A | 7/2000 | Iizuka | |
| 6,239,894 B1 | 5/2001 | Ishibe | |
| 6,249,307 B1 | 6/2001 | Ueno | |
| 6,341,030 B1 | 1/2002 | Takeshita et al. | |
| 6,504,639 B1 | 1/2003 | Yoshikawa et al. | |
| 2002/0131137 A1* | 9/2002 | Suzuki | |

FOREIGN PATENT DOCUMENTS

| | | |
|---|---|---|
| JP | 4-194814 | 7/1992 |
| JP | 6-118325 | 4/1994 |
| JP | 6-281872 | 10/1994 |
| JP | 6-281873 | 10/1994 |
| JP | 9-187984 | 7/1997 |
| JP | 9-197310 | 7/1997 |
| JP | 11-30710 | 2/1999 |
| JP | 11-153764 | 6/1999 |
| JP | 2000-19443 | 1/2000 |
| JP | 2001-033725 | 2/2001 |
| WO | 01/23942 | 4/2001 |

* cited by examiner

OPTICAL SCANNING DEVICE, IMAGE READING DEVICE PROVIDED WITH THIS, IMAGE FORMING DEVICE, AND PHOTOGRAPHING DEVICE

TECHNICAL FIELD

The present invention relates to an optical scanner that is used in image reading apparatus such as a laser beam printer, a laser facsimile, a digital copier and the like, or image forming apparatus and photographic processing apparatus that are used to write images.

BACKGROUND ART

Most types of optical scanners that are used in laser beam printers and the like have a configuration including a semiconductor laser as a light source, a polygon mirror that is a rotary polyhedral mirror, a first image forming optical system for linearly focusing a light beam from the light source on the rotary polyhedral mirror so that a tilt of a surface of the rotary polyhedral mirror can be corrected, and a second image forming optical system for forming a uniform beam spot on a surface to be scanned at a constant speed.

The conventional optical scanners have been of a configuration in which a second image forming optical system is referred to as an fθ lens and formed of a plurality of large-sized glass lenses. Because of this, the second image forming optical system hardly is reduced in size and is costly, which has been disadvantageous.

With this as a background, in recent years, for the realization of size and cost reductions, a configuration in which a single curved surface mirror is used in a second image forming optical system has been proposed as in JP 4(1992)-194814 A, JP 6(1994)-118325 A, JP 6(1994)-281872 A, JP 6(1994)-281873 A, JP11(1999)-30710 A, JP11(1999)-153764 A and the like.

Meanwhile, in order to achieve high-speed scanning by increasing a rotation speed of a rotary polyhedral mirror, JP2001-33725 A or the like proposes a configuration regarding a bearing for a rotary shaft that withstands high-speed rotation. Further, JP2000-19443 A or the like proposes a configuration in which a rotary polyhedral mirror with an increased number of reflecting surfaces is used so that scanning can be preformed at a higher speed without increasing a rotation speed.

However, in most types of optical scanners of the configuration including a single curved surface mirror, while excellent performance can be attained in terms of a field curvature, fθ characteristics and a scanning line curvature, an excellent beam spot cannot be obtained due to insufficient correction for light ray aberration, which has been disadvantageous.

Furthermore, JP11(1999)-30710 A proposes an optical scanner and describes a configuration as a model in which the optical scanner leads a light beam from a curved surface mirror directly to an image plane. However, in this configuration, a light beam is reflected off the curved surface mirror at a small reflection angle, and thus in practice, in order for the light beam to be led to a photosensitive drum, it is required that a returning mirror be disposed between the curved surface mirror and the photosensitive drum. Further, a cross section in a sub scanning direction of the curved surface mirror is not in a circular arc shape but in a shape represented by a four-dimensional polynomial, thereby making it difficult to perform processing and evaluations with respect to the curved surface mirror, which has been disadvantageous.

In a configuration disclosed in JP11(1999)-153764 A, a light beam from a single curved surface mirror can be led directly to a photosensitive drum without requiring a returning mirror, and the curved surface mirror is formed in a shape that allows processing and evaluations to be performed with relative ease. However, in this configuration, light beams from two light sources are scanned so that scanning can be performed at a higher speed, thereby increasing the number of constituent components, which has been disadvantageous.

In the configuration proposed in JP2001-33725 A, a bearing part of a rotary polyhedral mirror is formed of a dynamic pressure bearing so as to withstand high-speed rotation. However, in this configuration, it is required that the bearing part be processed with high accuracy, thereby incurring higher cost, which has been disadvantageous.

In the configuration proposed in JP 2000-19443 A that uses the rotary polyhedral mirror with an increased number of reflecting surfaces, a second image forming optical system is formed of a single lens. However, in this configuration, since the single lens is configured as an aspheric lens, it is required industrially that the lens be formed of a plastic lens, thereby increasing the change in performance according to temperature characteristics, which has been disadvantageous.

DISCLOSURE OF THE INVENTION

With the foregoing in mind, it is an object of the present invention to provide an optical scanner that can perform high-speed scanning, while securing excellent optical performance at a reduced cost.

In order to achieve the above-mentioned object, an optical scanner according to the present invention scans a light beam on a surface to be scanned in a main scanning direction and a sub scanning direction orthogonal to the main scanning direction. The optical scanner includes a light source, a rotary polyhedral mirror that scans a light beam from the light source, an image forming optical system that is disposed between the light source and the rotary polyhedral mirror and forms a line image larger in size than a width in the main scanning direction of one reflecting surface of the rotary polyhedral mirror on the reflecting surface, and a curved surface mirror that is disposed between the rotary polyhedral mirror and the surface to be scanned. In the optical scanner, the light source, the image forming optical system, the rotary polyhedral mirror and the curved surface mirror are arranged respectively in different positions in the sub scanning direction. A light beam from the image forming optical system is incident on the reflecting surface of the rotary polyhedral mirror obliquely with respect to a first plane that includes a normal of the reflecting surface and is parallel to the main scanning direction. A light beam reflected off the rotary polyhedral mirror is incident on the curved surface mirror obliquely with respect to a second plane that includes a normal at a vertex of the curved surface mirror and is parallel to the main scanning direction.

According to the optical scanner described above, the use of a single curved surface mirror allows reflected light from a rotary polyhedral mirror to be incident on a surface to be scanned, and thus a rotary polyhedral mirror having a small inradius and an increased number of reflecting surfaces can be used, thereby allowing excellent optical performance and high-speed scanning to be realized.

Preferably, in the above-mentioned optical scanner, where an angle formed between a center axis of a light beam directed toward the curved surface mirror and the second plane is indicated as θM (°), a relationship represented by 6<θM<10 is satisfied. According to the optical scanner described above, while the occurrence of shading can be prevented, an optical scanner reduced in thickness can be realized.

Furthermore, preferably, where in the sub scanning direction, a direction of an angle that the reflected light beam from the rotary polyhedral mirror forms with respect to the incident light beam from the image forming optical system is defined as a positive direction, in the sub scanning direction, a reflected light beam from the curved surface mirror forms an angle in a negative direction with respect to the incident light beam from the rotary polyhedral mirror. According to the optical scanner described above, it is possible to correct an aberration caused when the optical path of a light beam is bent while the light beam is reflected obliquely.

Furthermore, preferably, where an absolute value of an angle that the normal of the reflecting surface of the rotary polyhedral mirror forms with the incident light beam from the image forming optical system is indicated as θP (°), and an absolute value of an angle that the normal at the vertex of the curved surface mirror forms with the reflected light beam from the rotatable polyhedral mirror is indicated as θM (°), a relationship represented by 1.3<θM/θP<1.7 is satisfied. According to the optical scanner described above, it is possible to correct an aberration with higher accuracy, which is caused when the optical path of a light beam is bent while the light beam is reflected obliquely, thereby allowing an excellent beam spot to be formed on a surface to be scanned.

Furthermore, preferably, where a distance between the reflecting surface of the rotary polyhedral mirror and the vertex of the curved surface mirror is indicated as L, and a distance between the vertex of the curved surface mirror and the surface to be scanned is indicated as D, a relationship represented by 0.3<L/(L+D)<0.55 is satisfied. According to the optical scanner described above, while the occurrence of an aberration in an oblique direction can be prevented, an optical scanner reduced in thickness can be realized.

Furthermore, preferably, where the curved surface mirror has a radius of curvature in the main scanning direction that is indicated as Rdy and a radius of curvature in the sub scanning direction that is indicated as RDx, and a distance between the vertex of the curved surface mirror and the surface to be scanned is indicated as D, relationships represented respectively by 0.7<2D/|RDy|<1.3 and 2.2<RDy/RDx<3.2 are satisfied.

The relationship 0.7<2D/|RDy|<1.3 is satisfied, and thus while deterioration of the scanning linearity can be prevented, the occurrence of an aberration can be prevented.

The relationship 2.2<RDy/RDx<3.2 is satisfied, and thus aberrations in various forms that are attributable to a less balanced arrangement of the whole system can be corrected without difficulty, thereby allowing higher resolution to be achieved.

Furthermore, preferably, the curved surface mirror has a circular arc shape in cross section in the sub scanning direction. According to the curved surface mirror described above, processing and evaluations can be performed more easily.

Furthermore, preferably, the curved surface mirror has a shape that allows correction for a curve in a scanning line caused due to oblique light incidence.

Furthermore, preferably, the curved surface mirror is asymmetrical with respect to the second plane. According to the optical scanner described above, an optical system can be of a simple configuration, and while a light ray aberration caused due to oblique incidence of a light beam can be corrected, a curve in a scanning line also can be corrected.

Furthermore, preferably, the curved surface mirror has a twisted shape such that on a generatrix that is a curve where the second plane and a curved surface of the curved surface mirror intersect each other, normals at points other than the vertex of the curved surface mirror are not included in the second plane. According to the optical scanner described above, an optical system can of a simple configuration, and while a light ray aberration caused due to oblique incidence of a light beam can be corrected, a curve in a scanning line also can be corrected.

Furthermore, preferably, an angle that each of the normals at the points on the generatrix forms with the second plane is increased in a direction toward a periphery of the curved surface mirror. According to the optical scanner described above, a curve in a scanning line caused due to oblique light incidence can be corrected.

Furthermore, preferably, where a direction of an angle that the reflected light beam from the rotary polyhedral mirror forms with respect to the incident light beam on the rotary polyhedral mirror is defined as a positive direction, each of the normals at the points on the generatrix forms an angle in the positive direction with respect to the second plane. According to the optical scanner described above, a curve in a scanning line caused due to oblique light incidence can be corrected.

Furthermore, preferably, the curved surface mirror is formed of an anamorphic mirror having a radius of curvature at the vertex in the main scanning direction that is different from a radius of curvature at the vertex in the sub scanning direction. According to the optical scanner described above, positions of an image plane in the main scanning direction and the sub scanning direction and a field curvature can be set to be near the surface to be scanned, thereby allowing optimum scanning to be performed.

Furthermore, preferably, the curved surface mirror has a concave shape in each of the main scanning direction and the sub scanning direction. According to the optical scanner described above, positions of an image plane in the main scanning direction and the sub scanning direction and a field curvature can be set to be near the surface to be scanned, thereby allowing optimum scanning to be performed.

Furthermore, preferably, the curved surface mirror has a shape such that an optical power generated by reflection in the sub scanning direction is changed in level between in a central portion and in a peripheral portion in the main scanning direction. According to the optical scanner described above, a field curvature in a sub scanning direction can be corrected.

Furthermore, preferably, the curved surface mirror has a shape such that a radius of curvature of the curved surface mirror in cross section in the sub scanning direction does not depend on a shape of the curved surface mirror in cross section in the main scanning direction. According to the optical scanner described above, a field curvature in a sub scanning direction can be corrected.

Furthermore, preferably, in the image forming optical system, the light beam from the light source is converged in the main scanning direction. According to the optical scanner described above, while a distance from a curved surface mirror to a position on which a light beam is focused can be decreased, excellent performance can be attained in terms of a field curvature in each of a main scanning direction and a sub scanning direction and fθ characteristics.

Furthermore, preferably, in the image forming optical system, the light beam from the light source diverges in the main scanning direction. According to the optical scanner described above, while a distance from a curved surface mirror to a position on which a light beam is focused can be increased so that excellent performance can be attained in terms of a field curvature in each of a main scanning direction and a sub scanning direction and fθ characteristics, an arrangement of devices in an optical housing can be simplified.

Furthermore, preferably, the optical scanner further includes a wavelength changeable light source and a wavelength controlling part. According to the optical scanner described above, since the size of a beam spot is substantially proportional to a wavelength, by controlling a wavelength, a beam spot formed on a surface to be scanned can be controlled so as to have an arbitrary size. Moreover, an optical system that allows reflected light from a rotary polyhedral mirror to be incident on the surface to be scanned can be formed of a reflecting mirror alone, so that no chromatic aberration is caused, thereby allowing an arbitrary resolution to be attained without deteriorating other performance capabilities such as fθ characteristics and the like.

Furthermore, preferably, the number of the light sources is two or higher, and the optical scanner further includes a light combining member that is disposed between the light source and the rotary polyhedral mirror and combines light beams from the light sources so that a spacing in the sub scanning direction between beam spots formed on the surface to be scanned has a predetermined value. According to the optical scanner described above, a plurality of light beams can be scanned simultaneously, thereby allowing high-speed scanning to be performed practically.

Moreover, preferably, the optical scanner further includes a sub direction light beam controller that is disposed between the light source and the rotary polyhedral mirror and changes a tilt or a height in the sub scanning direction of at least one of the light beams from the light sources. According to the optical scanner described above, a spacing in sub scanning direction between light beams can be realized with higher accuracy.

Furthermore, preferably, the light combining member is formed of a dichroic mirror.

Furthermore, preferably, the sub direction light beam controller is formed of a galvanomirror. The galvanomirror is driven so as to change a direction in which a light beam incident on the galvanomirror is reflected, and thus a tilt or a height of the light beam in the sub scanning direction can be changed.

Furthermore, preferably, the sub direction light beam controller is formed of a prism. The prism is driven to rotate so as to change a direction in which a light beam incident on the prism is refracted, and thus a tilt or a height in the sub scanning direction of the light beam can be changed.

Furthermore, preferably, the number of the light sources is two or higher, the light sources being of different wavelengths, and the optical scanner further includes a light combining member that is disposed between the light source and the rotary polyhedral mirror and combines light beams from the light sources on a common axis, and a light separator that is disposed between the rotary polyhedral mirror and the surface to be scanned and separates light beams. According to the optical scanner described above, a plurality of light beams can be scanned simultaneously, thereby allowing high-speed scanning to be performed practically.

Furthermore, preferably, the light separator is formed of a prism.

Furthermore, preferably, the light combining member is formed of a dichroic mirror. According to the optical scanner described above, the light utilizing efficiency can be increased.

Furthermore, preferably, the number of the light sources is two or a higher, the light sources being of different wavelengths, and the optical scanner further includes a light combining member that is disposed between the light source and the rotary polyhedral mirror and combines light beams from the light sources so that a spacing in the sub scanning direction between beam spots formed on the surface to be scanned has a predetermined value, and a light separator that is disposed between the rotary polyhedral mirror and the surface to be scanned and separates light beams. According to the optical scanner described above, a plurality of light beams can be scanned simultaneously, thereby allowing high-speed scanning to be performed practically.

Furthermore, preferably, the light separator is formed of a prism.

Furthermore, preferably, the light combining member is formed of a dichroic mirror. According to the optical scanner described above, the light utilizing efficiency can be increased.

Furthermore, preferably, the curved surface mirror causes a scanning line curvature in a direction that allows a scanning line curvature caused in the light separator to be corrected. According to the optical scanner described above, a curvature in a scanning line in a sub scanning direction can be corrected.

Furthermore, preferably, the number of the light sources is two, the light sources being of different wavelengths, where the wavelengths of the light sources are indicated respectively as $\lambda 1$ and $\lambda 2$, an angle formed between an incidence surface and an emitting surface of the prism is indicated as $\theta pz$, a distance from the emitting surface of the prism to an image plane on an optical path at the wavelength $\lambda 1$ is indicated as $Dp$, a refractive index of a material constituting the prism at the wavelength $\lambda 1$ is indicated as $n1$, a refractive index of the material at the wavelength $\lambda 2$ is indicated as $n2$, and a spacing in the sub scanning direction between positions at a scanning center, on which light beams having the respective wavelengths are focused, respectively, is indicated as $xd$, a relational expression $Dp \cdot \cos(\theta A)\{\tan(\theta B) - \tan(\theta A)\} < xd$ is satisfied, and in the relational expression, $\theta A = \sin^{-1}\{n1 \cdot \sin(\theta pz)\} - \theta pz$, and $\theta B = \sin^{-1}\{n2 \cdot \sin(\theta pz)\} - \theta pz$. According to the optical scanner described above, a spacing in a sub scanning direction between two scanning lines can be maintained substantially constant, thereby allowing higher resolution to be attained.

Furthermore, preferably, the number of the light sources is two or higher, the light sources being of different wavelengths, and the optical scanner further includes a light combining member that is disposed between the light source and the rotary polyhedral mirror and combines light beams from the light sources on a common axis, and a flat-shaped light separator that is disposed between the rotary polyhedral mirror and the surface to be scanned and separates light beams. According to the optical scanner described above, a plurality of light beams can be scanned simultaneously, thereby practically allowing high-speed scanning to be performed.

Preferably, the light combining member is formed of a dichroic mirror. According to the optical scanner described above, the light utilizing efficiency can be increased.

Furthermore, preferably, the flat-shaped light separator is formed of a dichroic mirror. According to the optical scanner described above, the light utilizing efficiency can be increased.

Furthermore, preferably, the flat-shaped light separator is formed of a diffracting element. According to the optical scanner described above, a flat-shaped light separator can be used also as an aberration corrector.

Furthermore, preferably, the number of the light sources is three or higher, the light sources being of different wavelengths, the optical scanner further includes a light combining member that is disposed between the light source and the rotary polyhedral mirror and combines light beams from the light sources on a common axis, and the light beams corresponding to the wavelengths are focused on a common axis on the surface to be scanned. According to the optical scanner described above, a light beam deflected by a rotary polyhedral mirror is focused on a surface to be scanned by reflection off a curved surface mirror alone and thus can be focused on the surface to be scanned without causing any chromatic aberration. Thus, light beams can be scanned so as to be superimposed completely on a common axis on a surface to be scanned.

Furthermore, preferably, the light source is a laser light source that emits a light beam having a wavelength corresponding to any of three primary colors or complementary colors of the three primary colors. According to the optical scanner described above, a surface to be scanned can be formed of a photographic paper sheet.

Furthermore, preferably, the light source is formed of a semiconductor laser.

Furthermore, preferably, each of the light sources is a laser light source and includes a wavelength converting element so that the wavelength converting elements correspond respectively to the light sources.

Furthermore, preferably, the light source is formed of a semiconductor laser. According to the optical scanner described above, an optical scanner can be reduced in size, and modulation also can be performed directly using a predetermined writing signal, thereby allowing a system to have a simple configuration.

Furthermore, each of the light sources is a laser light source and includes a wavelength converting element and an acousto-optic modulating element so that the wavelength converting elements and the acousto-optic modulating elements conform respectively to the light sources. According to the optical scanner described above, particularly, a light beam having a wavelength near 530 nm and a light beam having a wavelength near 450 nm, which are required for three primary colors or complementary colors of the three primary colors, can be obtained using a less costly, high-power semiconductor laser having an oscillation wavelength in the near-infrared region. Moreover, by driving the acousto-optic modulating element using a predetermined writing signal, optical writing can be performed while a semiconductor laser performs continuous oscillation.

Furthermore, preferably, the surface to be scanned is formed of a photographic paper sheet.

Furthermore, preferably, with respect to coordinates (x, y) defined by a coordinate x (mm) in the sub scanning direction and a coordinate y (mm) in the main scanning direction with a vertex of a surface of the curved surface mirror as an origin point, where a direction in which a reflected light beam is directed is defined as a positive direction, the curved surface mirror has the surface of a shape having a sag amount z (mm) from the vertex represented by a relational expression:

$$Z = f(y) + \frac{\frac{X^2}{g(y)} - 2X \cdot \sin\{\theta(y)\}}{\cos\{\theta(y)\} + \sqrt{\cos^2\{\theta(y)\} - \left[\frac{x}{g(y)}\right]^2 + \frac{2X \cdot \sin\{\theta(y)\}}{g(y)}}}$$

in the above-mentioned relational expression, f(y) is an expression defining a non-circular arc shape on a generatrix and is represented by $$f(y) = \frac{\left[\frac{y^2}{RDy}\right]}{1 + \sqrt{1 - (1+k)\left[\frac{y}{RDy}\right]^2}} + ADy^4 + AEy^6 + AFy^8 + AGy^{10}$$

where a radius of curvature in the main scanning direction at the vertex is indicated as RDy (mm), and constants of a high order defining a shape of the generatrix are indicated as AD, AE, AF and AG, g(y) indicating a radius of curvature in the sub scanning direction (x-direction) at a position defined by the coordinate y is represented by $g(y)=RDx(1+BCy^2+BDy^4+BEy^6+BFy^8+BGy^{10})$ where a radius of curvature in the sub scanning direction is indicated as RDx (mm), and constants determining the radius of curvature in the sub scanning direction at the position defined by the coordinate y are indicated as BC, BD, BE, BF and BG, and θ(y) is an expression indicating a torsion amount at the position defined by the coordinate y and is represented by $\theta(y)=ECy^2+EDy^4+EEy^6$ where torsion constants determining the torsion amount at the position defined by the coordinate y are indicated as EC, ED and EE. According to the optical scanner described above, high aberration correcting capability can be attained using an optical system of a simple configuration.

Furthermore, preferably, the number of the reflecting surfaces of the rotary polyhedral mirror is 10 to 20. According to the optical scanner described above, while a rotary polyhedral mirror can be reduced in inradius, high-speed scanning can be performed at a lower rotation speed.

Next, an image reading apparatus according to the present invention includes the optical scanner described above. According to the image reading apparatus described above, while high-speed reading can be performed, an image reading apparatus that achieves a cost reduction can be realized.

Furthermore, an image forming apparatus according to the present invention includes the optical scanner described above. According to the image forming apparatus described above, while high-speed writing can be performed, an image forming apparatus that achieves a cost reduction can be realized.

Furthermore, a photographic processing apparatus according to the present invention includes the above-mentioned optical scanner including the three or more light sources having different wavelengths. According to the photographic processing apparatus described above, while high-speed writing can be performed, a photographic processing apparatus that achieves a cost reduction can be realized.

BEST MODE FOR CARRYING OUT THE INVENTION

Hereinafter, the present invention will be described by way of an embodiment with reference to the appended drawings.

(Embodiment 1)

Figure 1:
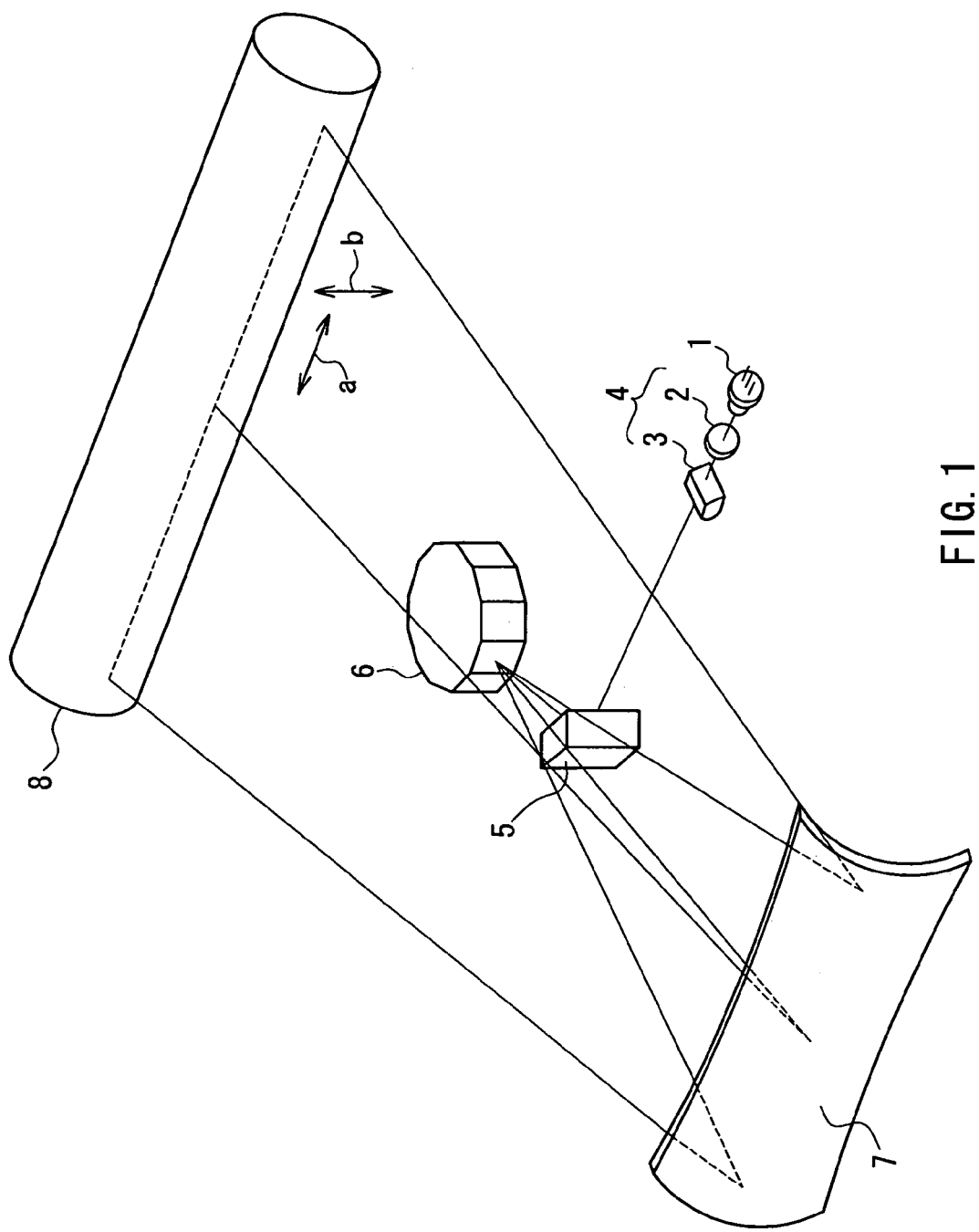
FIG. 1 is a structural view showing a main part of an optical scanner according to Embodiment 1 of the present invention.

FIG. 1 is a structural view of an optical scanner according to Embodiment 1 of the present invention. In the figure, a first image forming optical system 4 is disposed between a light source 1 using a semiconductor laser as a light source and a returning mirror 5. The first image forming optical system 4 includes an axially symmetrical lens 2 and a cylindrical lens 3.

The optical path of a light beam emitted from the first image forming optical system 4 is bent by the returning mirror 5, and then the light beam is incident on a reflecting surface on a rotary polyhedral mirror 6. The cylindrical lens 3 has a refractive power in a direction corresponding to a sub scanning direction (direction indicated by an arrow b), and thus the light beam that has been incident on the reflecting surface on the rotary polyhedral mirror 6 is focused into a line image extended in a main scanning direction (direction indicated by an arrow a).

In this embodiment, the line image is set to have a width larger than a width in the main scanning direction of one reflecting surface of the rotary polyhedral mirror 6, so that the light beam is incident on the rotary polyhedral mirror 6 in a so-called overfilled state. Thus, a rotary polyhedral mirror having a small inradius and an increased number of reflecting surfaces can be used, thereby allowing higher-speed scanning to be performed without increasing a rotation speed of the rotary polyhedral mirror. This is because the light beam is incident in the overfilled state, thereby allowing light beams to be incident continuously on one reflecting surface of the rotary polyhedral mirror 6 used for one scanning operation.

Moreover, a rotary polyhedral mirror having a small inradius can be used, and thus the rotary polyhedral mirror is driven to rotate at a lower load, so that rotation can be started at a higher speed, and a low-load motor also can be used. The light beam deflected/reflected by the rotary polyhedral mirror 6 is converged by an optical power of a curved surface mirror 7 and then is focused to be scanned on a photosensitive drum 8 as a surface to be scanned.

Figure 2:
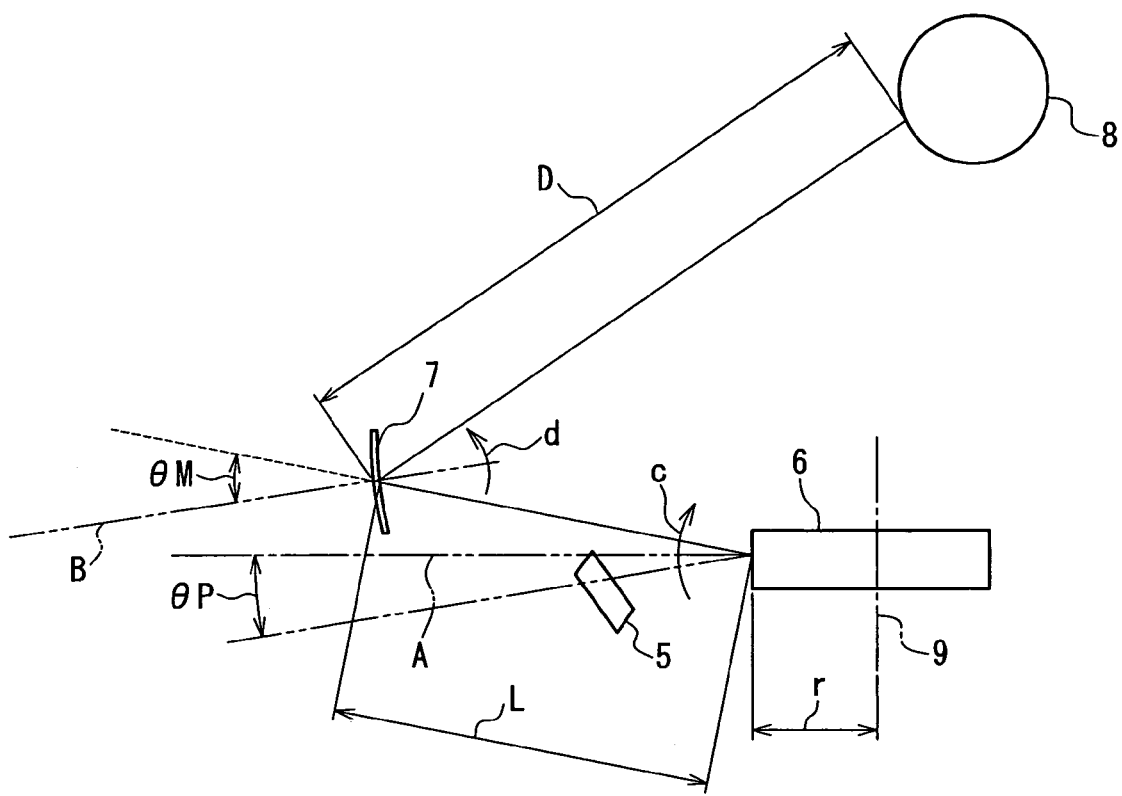
FIG. 2 is a structural view in cross section in a sub scanning direction of the main part of the optical scanner shown in FIG. 1.
Figure 3A:
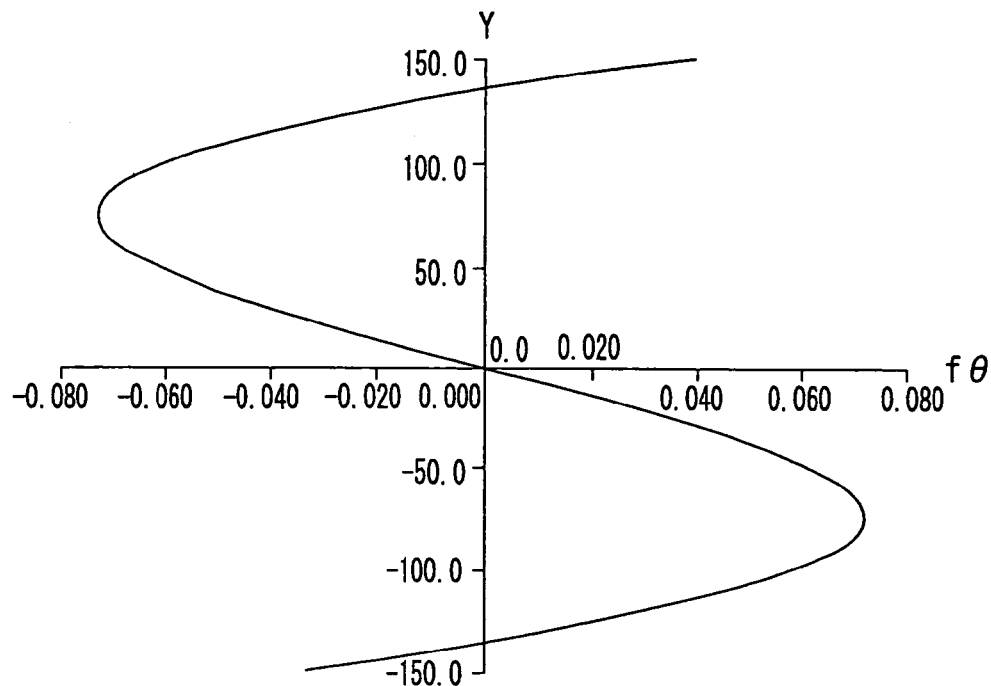
FIG. 3A is a characteristic diagram showing an fθ error described with regard to Example 1.
Figure 3B:
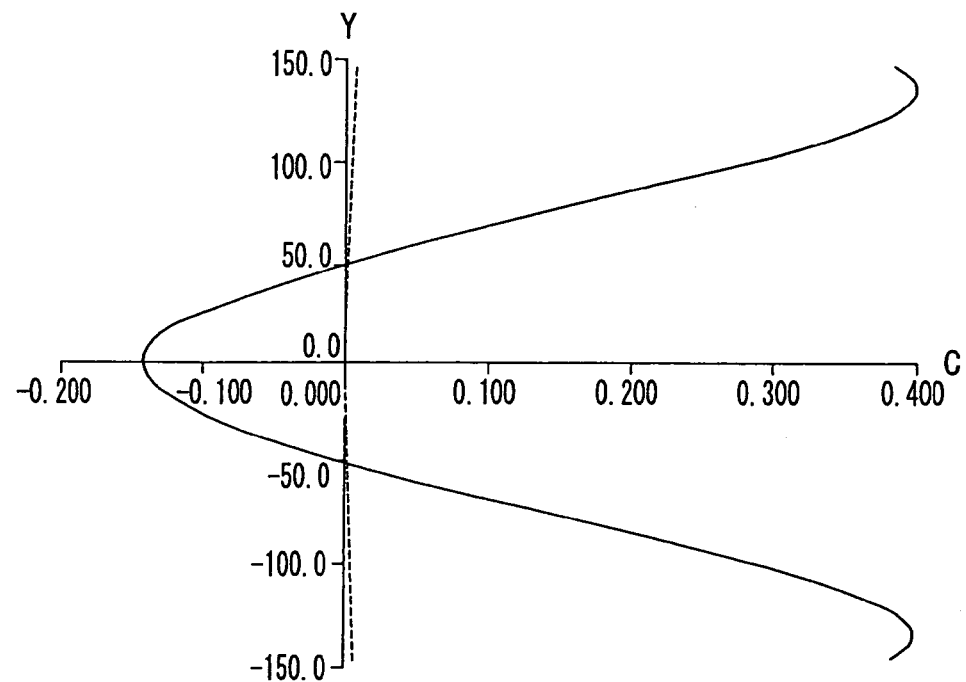
FIG. 3B is a characteristic diagram showing a field curvature described with regard to Example 2.
Figure 4A:
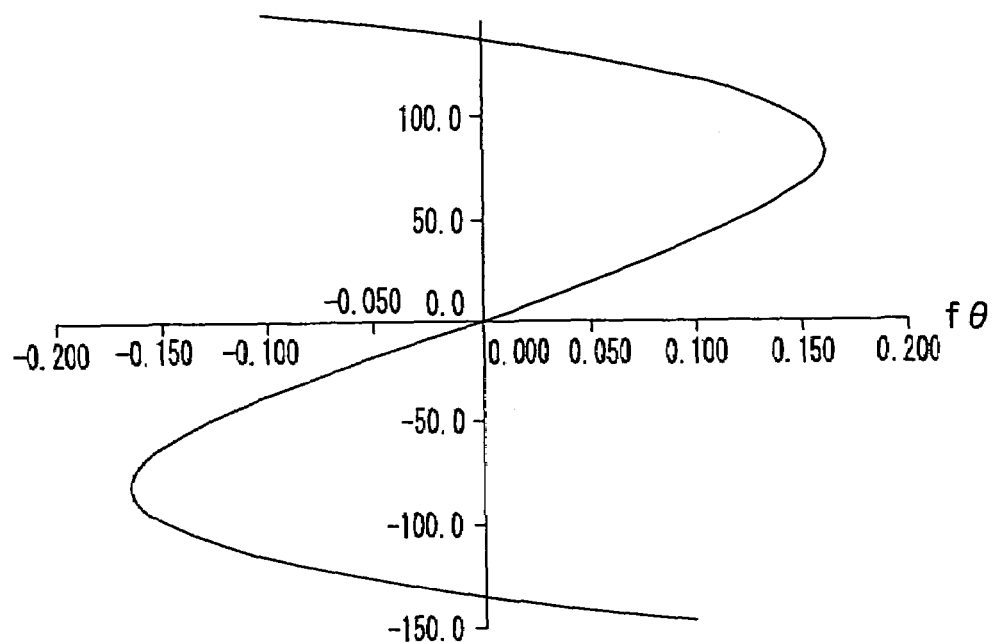
FIG. 4A is a characteristic diagram showing an fθ error described with regard to Example 2.
Figure 4B:
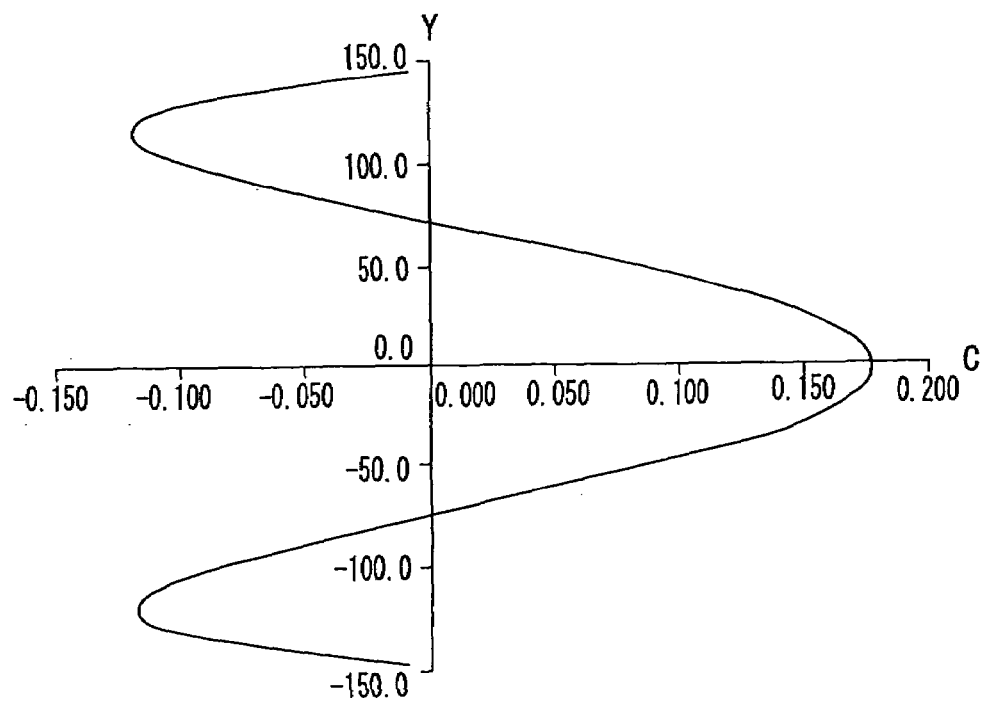
FIG. 4B is a characteristic diagram showing a field curvature described with regard to Example 2.
Figure 5A:
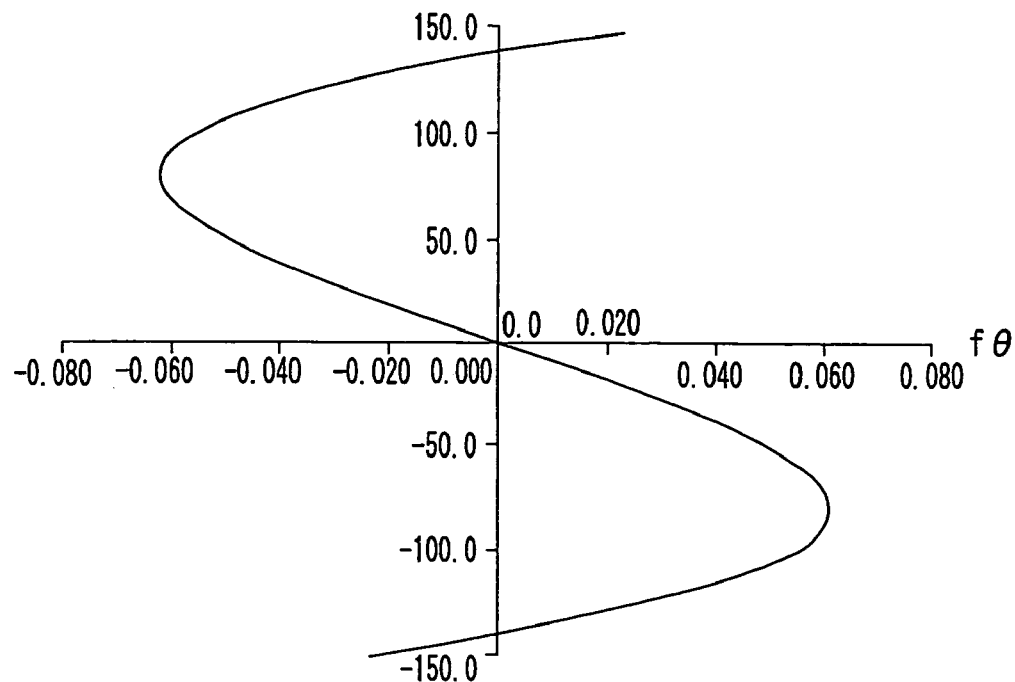
FIG. 5A is a characteristic diagram showing an fθ error described with regard to Example 3.
Figure 5B:
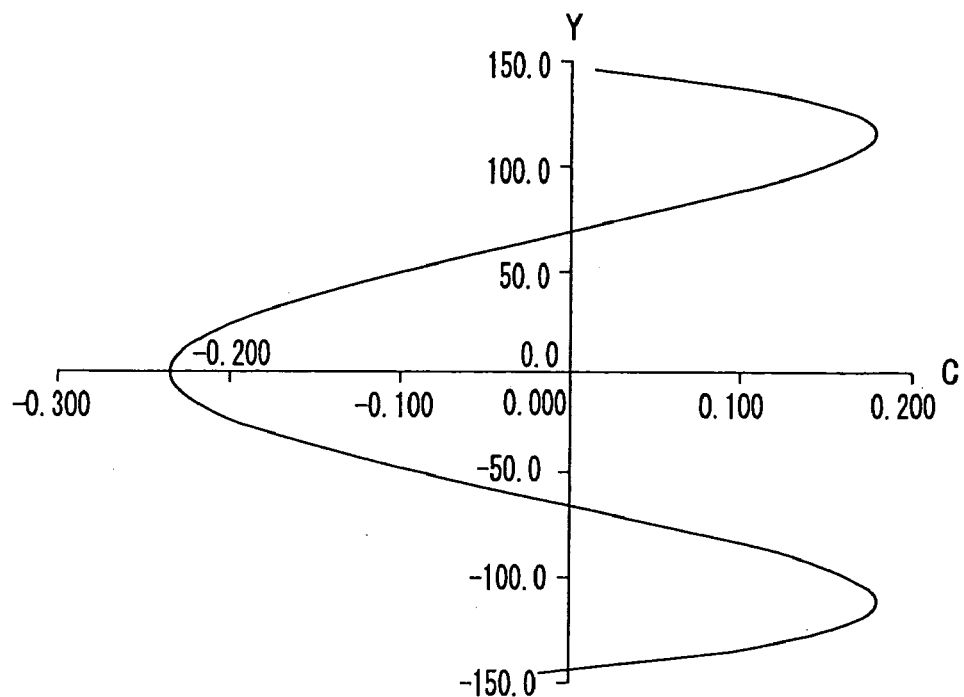
FIG. 5B is a characteristic diagram showing a field curvature described with regard to Example 3.
Figure 6A:
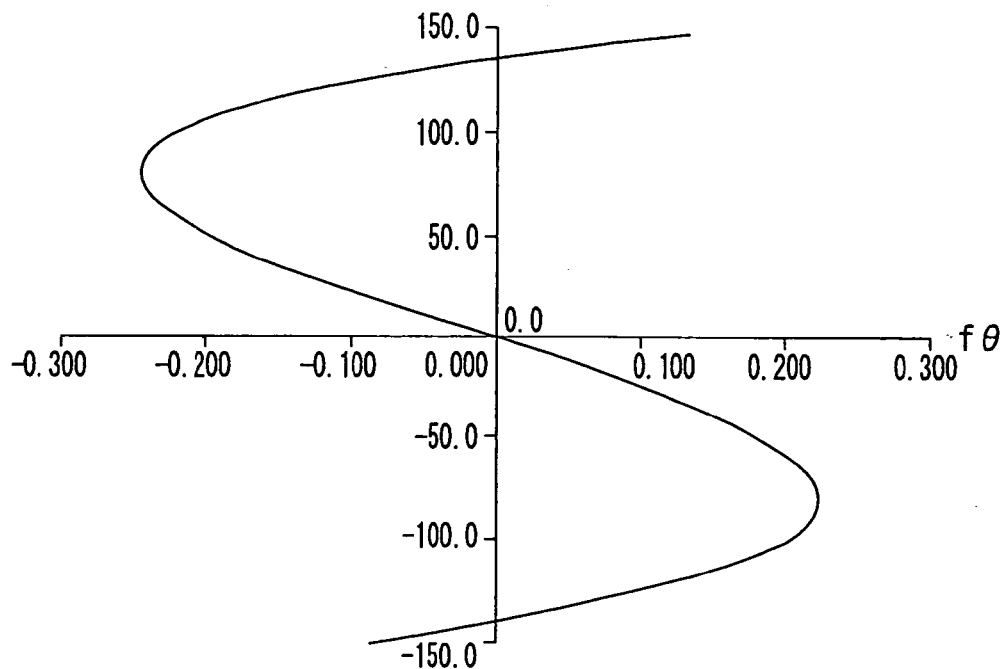
FIG. 6A is a characteristic diagram showing an fθ error described with regard to Example 4.
Figure 6B:
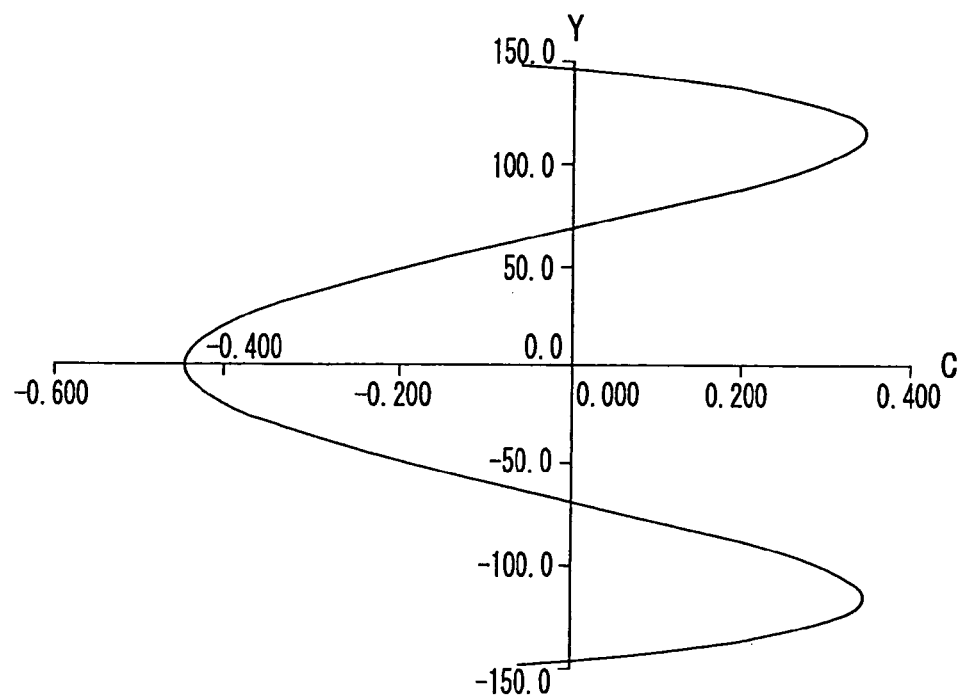
FIG. 6B is a characteristic diagram showing a field curvature described with regard to Example 4.

FIG. 2 is a cross sectional view in the sub scanning direction of the optical scanner shown in FIG. 1. In this embodiment, a rotational center axis 9 of the rotary polyhedral mirror 6 is positioned substantially at a center of a region defined by a scanning width. A light beam reflected off the returning mirror 5 is incident on the reflecting surface of the rotary polyhedral mirror 6 obliquely with respect to a first plane A that includes a normal of this reflecting surface and is parallel to the main scanning direction. Further, the light beam deflected and reflected at the rotary polyhedral mirror 6 is incident on the curved surface mirror 7 obliquely with respect to a plane B that includes a normal at a vertex of the curved surface mirror 7 and is parallel to the main scanning direction.

In FIG. 2, r denotes an inradius of the rotary polyhedral mirror 6, L denotes a distance between a deflection/reflection point and the vertex of the curved surface mirror 7, and D denotes a distance between the vertex of the curved surface mirror 7 and the photosensitive drum 8. Further, θP denotes an angle formed between an optical axis of a light beam from the returning mirror 5 and a normal of the deflecting/reflecting surface, and θM denotes an angle formed between an optical axis of a light beam from the deflecting/reflecting surface and the normal at the vertex of the curved surface mirror 7.

With respect to coordinates (x, y) defined by a coordinate x in the sub scanning direction and a coordinate y in the main scanning direction with a vertex of a surface of the curved surface mirror 7 as an origin point, where a direction to which an incident light beam is directed is defined as a positive direction, the curved surface mirror 7 has the surface of a shape having a sag amount z at the coordinates (x, y) from the vertex represented by the following expression (1).

$$Z = f(y) + \frac{\frac{X^2}{g(y)} - 2X \cdot \sin\{\theta(y)\}}{\cos\{\theta(y)\} + \sqrt{\cos^2\{\theta(y)\} - \left[\frac{x}{g(y)}\right]^2 + \frac{2X \cdot \sin\{\theta(y)\}}{g(y)}}}$$

In the expression (1), f(y) that is an expression defining a non-circular arc shape on a generatrix (a curve where the second plane B and a curved surface of the curved surface mirror 7 intersect each other), g(y) indicating a radius of curvature in the sub scanning direction (x-direction) at a position defined by the coordinate y, and θ(y) that is an expression indicating a torsion amount at the position defined by the coordinate y are represented respectively by the following expressions (2), (3) and (4).

$$f(y) = \frac{\left[\frac{y^2}{RDy}\right]}{1 + \sqrt{1 - (1+k)\left[\frac{y}{RDy}\right]^2}} +$$
$$= ADy^4 + AEy^6 + AFy^8 + AGy^{10}$$

Expression (2)

$$g(y) = RDx(1 + BCy^2 + BDy^4 + BEy^6 + BFy^8 + BGy^{10})$$

Expression (3)

$$\theta(y) = ECy^2 + EDy^4 + EEy^6$$

Expression (4)

Herein, RDy (mm) denotes a radius of curvature in the main scanning direction at the vertex, RDx (mm) denotes a radius of curvature in the sub scanning direction, K denotes a cone constant defining a shape of the generatrix, AD, AE, AF and AG denote constants of a high order defining the shape of the generatrix, BC, BD, BE, BF and BG denote constants determining the radius of curvature in the sub scanning direction at the position defined by the coordinate y, and EC, ED and EE denote torsion constants determining the torsion amount at the position defined by the coordinate y.

As represented by these expressions, the curved surface mirror 7 has the non-circular arc shape in cross section in the main scanning direction and a radius of curvature in the sub scanning direction corresponding to the respective heights of images, which are determined so that field curvatures in the main and sub scanning directions and an fθ error can be corrected. Moreover, the surface of the curved surface mirror 7 has a torsion amount of the surface at a position corresponding to the respective heights of the images, which is determined so that a scanning line curvature can be corrected.

The shape of the curved surface mirror 7 represented by the above-mentioned expressions is described as an example of a free curved surface and may be represented by other expressions as long as the expressions can represent the same shape.

Moreover, in Embodiment 1, the following expressions are satisfied.

$$6 < \theta M < 10 \qquad \text{Expression (6)}$$

$$1.3 < \theta M/\theta P < 1.7 \qquad \text{Expression (7)}$$

$$0.3 < L/(L+D) < 0.55 \qquad \text{Expression (8)}$$

$$0.7 < |2D/RDy| < 1.3 \qquad \text{Expression (9)}$$

$$2.2 < RDy/RDx < 3.2 \qquad \text{Expression (10)}$$

The expression (6) relates to a reduction in thickness in the sub scanning direction of the optical scanner. With a value lower than the lower limit, when a light beam reflected off the curved surface mirror 7 passes over the rotary polyhedral mirror 6, in some cases, shading may occur. With a value higher than the upper limit, the value affects adversely the reduction in thickness.

As described above, by satisfying the expression (6), the optical scanner can be reduced in thickness. However, since a light beam is incident obliquely in the sub scanning direction at a large angle represented by 6<θM, a large light ray aberration is caused in the curved surface mirror 7. In this embodiment, a light beam is incident on the reflecting surface of the rotary polyhedral mirror 6 obliquely with respect to the first plane A so that this light ray aberration can be corrected.

Specifically, as shown in FIG. 2, with respect to a cross section in the sub scanning direction, where a direction (direction indicated by an arrow c) of an angle that a light beam reflected off the reflecting surface of the rotary polyhedral mirror 6 forms with respect to a light beam incident from the first image forming optical system 4 is defined as a positive direction, a direction (direction indicated by an arrow d) of an angle that a light beam reflected off the curved surface mirror 7 forms with respect to a light beam incident from the reflecting surface is defined as a negative direction. According to this configuration, it is possible to correct an aberration caused when the optical path of a light beam is bent while the light beam is reflected obliquely.

The expression (7) represents a more specific configuration. In realizing a reduction in thickness in the sub scanning direction of the optical scanner, an aberration is caused when the optical path of a light beam is bent while the light beam is reflected obliquely in a cross section in the sub scanning direction. The expression (7) indicates a condition under which such an aberration is corrected. With a value lower than the lower limit or a value higher than the upper limit, an aberration caused when a light beam is incident on the reflecting surface of the rotary polyhedral mirror 6 cannot be compensated with an aberration caused when a light beam is incident on the curved surface mirror 7, resulting in the occurrence of a residual aberration, which is a hindrance to the achievement of a reduction in thickness.

The expression (8) defines how the curved surface mirror 7 is positioned on the optical path from the rotary polyhedral mirror 6 to the photosensitive drum 8 as the surface to be scanned. With a value lower than the lower limit, while the curved surface mirror 7 can be reduced in size in the main scanning direction, an aberration in an oblique direction may be caused. With a value higher than the upper limit, the curved surface mirror 7 is increased in size in the main scanning direction, thereby being disadvantageous in terms of cost and size reductions of the optical scanner.

The expression (9) defines a state of a light beam in the main scanning direction, which is incident on the curved surface mirror 7 from the first image forming optical system 4. With a value lower than the lower limit, the light beam incident on the curved surface mirror 7 is in a state of a great degree of convergence in the main scanning direction, and thus an optical power in the main scanning direction of the curved surface mirror 7 becomes too small, thereby deteriorating the scanning linearity.

With a value higher than the upper limit, the light beam incident on the curved surface mirror 7 is in a state of a great degree of divergence in the main scanning direction, and thus it becomes necessary to increase the optical power in the main scanning direction of the curved surface mirror 7, which may result in the occurrence of an aberration.

The expression (10) relates to a ratio between an optical power level in the main scanning direction and an optical power level in the sub scanning direction of the curved surface mirror. With a value lower than the lower limit or a value higher than the upper limit, aberrations in various forms that are attributable to a less balanced arrangement of the whole system hardly can be corrected, thereby making it difficult to achieve higher resolution.

Hereinafter, examples of this embodiment are shown in the following tables. In the tables, Ymax denotes the maximum image height, and $\alpha$max denotes a polygon rotation angle corresponding to the maximum image height. Further, Tables 5 to 8 show values obtained in the respective cases of the examples with respect to the above-mentioned expressions (7) to (10).

TABLE 1

Example 1

| | | | | | | | | |
|---|---|---|---|---|---|---|---|---|
| | Ymax | 165 | $\alpha$max | 12.0 | | | | |
| | $\theta$P | 5.0 | $\theta$M | 7.3 | | | | |
| | L | 260.0 | D | 280.0 | | r | | 12.5 |
| RDy | −798.091 | RDx | −270.256 | K | 0.00000 | AD | 1.3017 × 10$^{-10}$ |
| AE | −2.9837 × 10$^{-16}$ | AF | 0.00000 | AG | 0.00000 | BC | −2.1363 × 10$^{-6}$ |
| BD | −1.4520 × 10$^{-12}$ | BE | 6.9318 × 10$^{-18}$ | BF | −6.6726 × 10$^{-23}$ | BG | 0.00000 |
| EC | −1.9803 × 10$^{-7}$ | ED | −2.3053 × 10$^{-13}$ | EE | −1.4246 × 10$^{-18}$ | | |

TABLE 2

Example 2

| | | | | | | | | |
|---|---|---|---|---|---|---|---|---|
| | Ymax | 165 | $\alpha$max | 12.0 | | | | |
| | $\theta$P | 5.0 | $\theta$M | 6.9 | | | | |
| | L | 235.0 | D | 400.0 | | r | | 12.5 |
| RDy | −681.059 | RDx | −296.709 | K | 0.00000 | AD | 3.5335 × 10$^{-10}$ |
| AE | −1.6918 × 10$^{-15}$ | AF | 0.00000 | AG | 0.00000 | BC | −1.4968 × 10$^{-6}$ |
| BD | −2.5755 × 10$^{-12}$ | BE | 1.2543 × 10$^{-17}$ | BF | −1.0406 × 10$^{-22}$ | BG | 0.00000 |
| EC | −2.0232 × 10$^{-7}$ | ED | −6.7273 × 10$^{-14}$ | EE | −1.9834 × 10$^{-18}$ | | |

TABLE 3

Example 3

| | | | | | | | | |
|---|---|---|---|---|---|---|---|---|
| | Ymax | 165 | $\alpha$max | 12.0 | | | | |
| | $\theta$P | 5.0 | $\theta$M | 7.4 | | | | |
| | L | 250.0 | D | 300.0 | | r | | 12.5 |
| RDy | −779.706 | RDx | −273.381 | K | 0.00000 | AD | 1.6939 × 10$^{-10}$ |
| AE | −1.6344 × 10$^{-16}$ | AF | 0.00000 | AG | 0.00000 | BC | −1.9766 × 10$^{-6}$ |
| BD | −1.7436 × 10$^{-12}$ | BE | 9.1385 × 10$^{-18}$ | BF | −3.6269 × 10$^{-24}$ | BG | 0.00000 |
| EC | −2.0737 × 10$^{-7}$ | ED | −1.8719 × 10$^{-13}$ | EE | −1.2529 × 10$^{-18}$ | | |

TABLE 4

Example 4

| | | | | | | | | |
|---|---|---|---|---|---|---|---|---|
| | Ymax | 165 | $\alpha$max | 12.0 | | | | |
| | $\theta$P | 5.0 | $\theta$M | 8.2 | | | | |
| | L | 235.0 | D | 290.0 | | r | | 12.5 |
| RDy | −808.421 | RDx | −260.376 | K | 0.00000 | AD | 2.5557 × 10$^{-10}$ |
| AE | 2.2322 × 10$^{-15}$ | AF | 0.00000 | AG | 0.00000 | BC | −1.9268 × 10$^{-6}$ |
| BD | −1.9637 × 10$^{-12}$ | BE | 2.4845 × 10$^{-17}$ | BF | −1.4253 × 10$^{-22}$ | BG | 0.00000 |
| EC | −2.4455 × 10$^{-7}$ | ED | −1.2203 × 10$^{-13}$ | EE | −1.5950 × 10$^{-19}$ | | |

TABLE 5

| Numerical Example | 1 | 2 | 3 | 4 |
|---|---|---|---|---|
| θM/θP | 1.46 | 1.38 | 1.48 | 1.64 |

TABLE 6

| Numerical Example | 1 | 2 | 3 | 4 |
|---|---|---|---|---|
| L/(L + D) | 0.48 | 0.37 | 0.45 | 0.45 |

TABLE 7

| Numerical Example | 1 | 2 | 3 | 4 |
|---|---|---|---|---|
| 2D/RDy | 0.70 | 1.17 | 0.77 | 0.72 |

TABLE 8

| Numerical Example | 1 | 2 | 3 | 4 |
|---|---|---|---|---|
| RDy/RDx | 2.95 | 2.30 | 2.85 | 3.10 |

FIGS. 3A, 4A, 5A and 6A show fθ errors caused in Examples 1 to 4, respectively. In each of the figures, a vertical axis Y indicates an image height (mm), and a horizontal axis fθ indicates an fθ error (mm). FIGS. 3B, 4B, 5B and 6B show field curvature characteristics in the cases of Examples 1 to 4, respectively. In each of the figures, a vertical axis Y indicates an image height (mm), and a horizontal axis C indicates a field curvature (mm). Further, in each of the figures, a solid line indicates a field curvature in the main scanning direction, and a dotted line indicates a field curvature in the sub scanning direction.

Herein, where a scanning speed per a unit rotation angle of the rotary polyhedral mirror 6 (polygon) at a position near a scanning center (speed at which a light beam is scanned on a surface of the photosensitive drum) is indicated as V (mm/deg), a polygon rotation angle is indicated as α (deg), and an image height is indicated as Y (mm), an fθ error ΔY is represented by the following expression (11).

$$\Delta Y = Y - V \cdot \alpha \quad \text{Expression (11)}$$

As can be seen from FIGS. 3 to 6, in each example, both the fθ error and the field curvature are reduced to small values, and thus excellent optical performance is exhibited.

In each example, the curved surface mirror 7 has a circular arc shape in cross section in the sub scanning direction, thereby allowing processing and evaluations to be performed easily. Further, in each example, the shape of the curved surface mirror 7 satisfies the above-mentioned expressions (1) to (5). Accordingly, in each example, the curved surface mirror 7 has a shape (i) allowing a curve in a scanning line caused due to oblique light incidence to be corrected, (ii) asymmetrical with respect to the plane B, (iii) which is a twisted shape such that normals at points other than a vertex on a curve where the plane B and the curved surface intersect each other (hereinafter, referred to as a "generatrix") are not included in the plane B, (iv) such that an angle that each of the normals at the points on the generatrix forms with the plane B is increased in a direction toward a periphery, and (v) such that where a direction of an angle that a light beam reflected off the curved surface mirror 7 forms with respect to an incident light beam from the reflecting surface of the rotatable polyhedral mirror 6 is defined as a positive direction, each of the normals at the points on the generatrix forms an angle in the positive direction with the plane B. Thus, an optical system can be of a simple configuration, and while a light ray aberration caused due to oblique incidence of a light beam can be corrected, a curve in a scanning line also can be corrected.

Furthermore, the curved surface mirror 7 has a shape (i) of an anamorphic mirror having a radius of curvature at the vertex in the main scanning direction that is different from a radius of curvature at the vertex in the sub scanning direction, (ii) having a concave mirror surface in each of the main and sub scanning directions, (iii) such that an optical power generated by reflection in the sub scanning direction is changed in level between in a central portion and in a peripheral portion in the main scanning direction, and (iv) such that a radius of curvature of the curved surface mirror 7 in cross section in the sub scanning direction does not depend on a shape of the curved surface mirror 7 in cross section in the main scanning direction. This allows positions of an image plane in the main scanning direction and the sub scanning direction and a field curvature to be optimized.

Moreover, in each of Examples 1, 3 and 4, in the first image forming optical system 4, a light beam from the light source 1 is converged in the main scanning direction. Thus, while a distance from the curved surface mirror 7 to a position on which the light beam is focused can be decreased, excellent performance can be attained in terms of a field curvature in each of the main scanning direction and the sub scanning direction and fθ characteristics.

Furthermore, in Example 2, in the first image forming optical system 4, a light beam from the light source 1 diverges in the main scanning direction. Thus, while a distance from the curved surface mirror 7 to a position on which the light beam is focused can be increased so that excellent performance can be attained in terms of a field curvature in each of the main scanning direction and the sub scanning direction and fθ characteristics, it is made easier to arrange devices in an optical housing.

Preferably, the optical scanner includes a wavelength changeable light source and a wavelength controlling part so as to correspond to the light source 1. The wavelength changeable light source can be formed of, for example, a light source configured as a combination of a semiconductor laser and a SHG element. This allows the use of a light beam having a fundamental wavelength and a light beam having a wavelength resulting from frequency mutiplification, and thus only the light beam having the necessary wavelength can be selected using a dichroic filter.

Since the spot size of a light beam focused by the optical system is substantially proportional to a wavelength, by controlling a wavelength, a beam spot formed on the photosensitive drum can be controlled so as to have an arbitrary size. Moreover, in this embodiment, a second image forming optical system is formed of a reflecting mirror alone, so that no chromatic aberration is caused, thereby allowing an arbitrary resolution to be attained without deteriorating other performance capabilities such as fθ characteristics and the like.

The curved surface mirror described with regard to Embodiment 1 also can be applied to each of the following embodiments. Therefore, in each of Embodiment 2 and the embodiments following Embodiment 2, a curved surface mirror is described without reference to the shape of a surface thereof and the action and effects thereof.

Furthermore, in each of the following embodiments, as in this embodiment, a light beam is incident obliquely on a rotary polyhedral mirror and a curved surface mirror, and a light beam is incident on the rotary polyhedral mirror in an overfilled state. Therefore, in each of Embodiment 2 and the embodiments following Embodiment 2, the description does not go into detail thereon.

Furthermore, as the number of reflecting surfaces of a rotary polyhedral mirror increases, the lower a rotation speed at which high-speed scanning can be performed. However, in order to attain a necessary resolution in the main scanning direction, it is required that the size of one reflecting surface in the main scanning direction be secured according to the width of a light beam, which may result in an excessive increase in inradius.

Thus, preferably, the number of the reflecting surfaces is 10 to 20. With the number of the reflecting surfaces set to less than 10, the rotation speed of the rotary polyhedral mirror cannot be decreased sufficiently with respect to high-speed scanning. With the number of the reflecting surfaces set to more than 20, the rotary polyhedral mirror is increased excessively in inradius. Similarly, in each of the following embodiments, preferably, the number of reflecting surfaces falls within this range.

(Embodiment 2)

Figure 7:
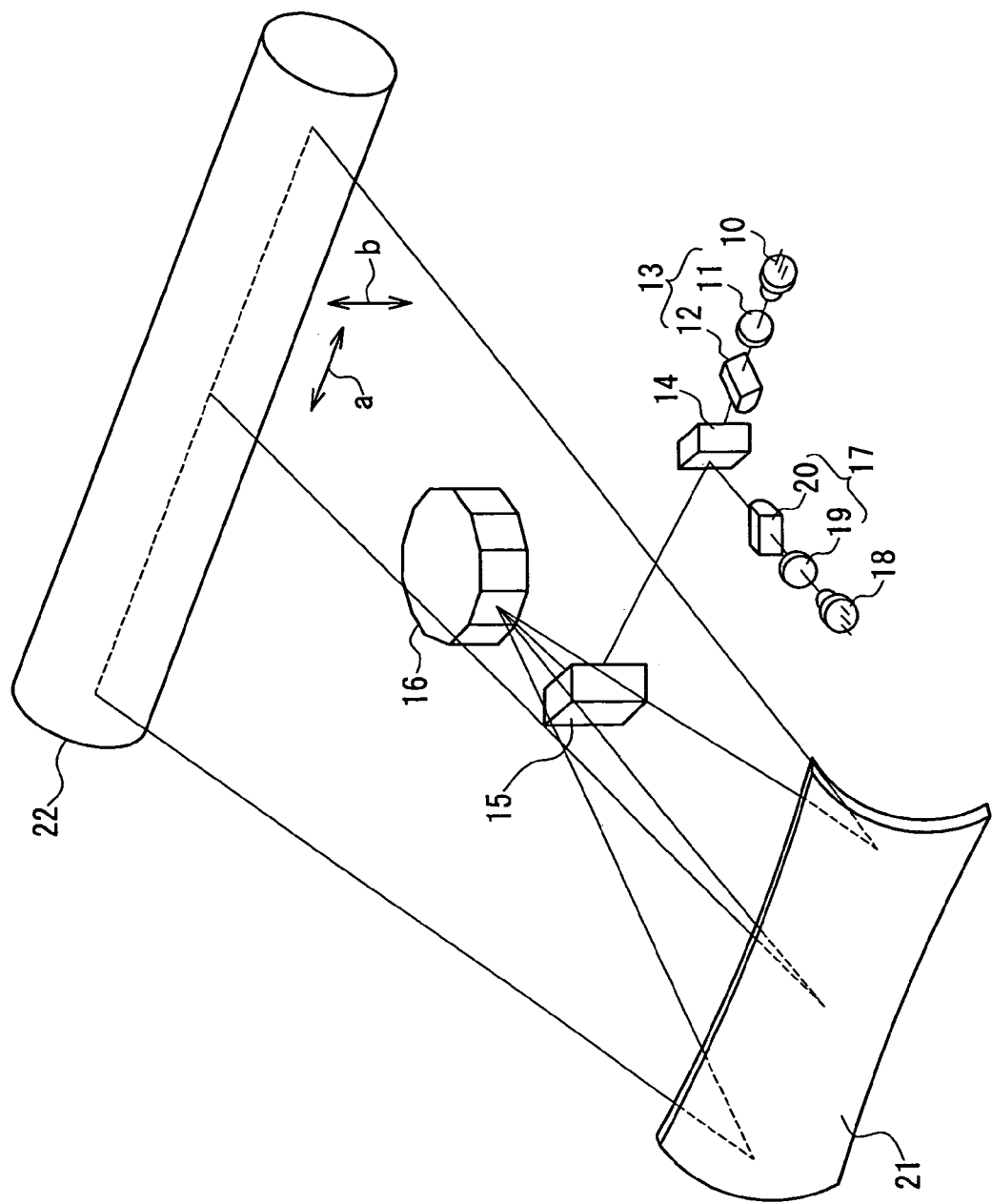
FIG. 7 is a structural view showing a main part of an optical scanner according to Embodiment 2 of the present invention.

FIG. 7 is a structural view of an optical scanner according to Embodiment 2. In this embodiment, the optical scanner includes two light sources 10 and 18, each using a semiconductor laser as a light source. A first image forming optical system 13 includes an axially symmetrical lens 11 and a cylindrical lens 12. A light beam emitted from the first image forming optical system 13 is transmitted through a light combining member 14. Then, the optical path of the light beam is bent by a returning mirror 15, so that the light beam is incident on a reflecting surface on a rotary polyhedral mirror 16. The cylindrical lens 12 has a refractive power in a direction corresponding to a sub scanning direction (direction indicated by an arrow b), and thus the light beam that has been incident on the reflecting surface on the rotary polyhedral mirror 16 is focused into a line image extended in a main scanning direction.

Furthermore, a second image forming optical system 17 includes an axially symmetrical lens 19 and a cylindrical lens 20. A light beam emitted from the second image forming optical system 17 is reflected off the light combining member 14. Then, the optical path of the light beam is bent by the returning mirror 15, so that the light beam is incident obliquely on the reflecting surface on the rotary polyhedral mirror 16. The cylindrical lens 20 has a refractive power in a direction corresponding to the sub scanning direction (direction indicated by the arrow b), and thus the light beam that has been incident on the reflecting surface on the rotary polyhedral mirror 16 is focused into a line image extended in the main scanning direction. Each of the light beams is incident on the rotary polyhedral mirror 16 in an overfilled state.

Each of the light beams deflected/reflected by the rotary polyhedral mirror 16 is incident obliquely on a curved surface mirror 21 to be converged by an optical power of the curved surface mirror 21 and then is focused to be scanned on a photosensitive drum 22 as a surface to be scanned.

In this embodiment, the two light beams are emitted from the two image forming optical systems. The light beams from the respective image forming optical systems are combined by the light combining member 14. In this case, the two light beams are combined so that on a photosensitive drum 22 a spacing in the sub scanning direction between two scanning lines has an appropriate value with respect to the resolution.

Thus, in this embodiment, the two different light beams emitted respectively from the two image forming optical systems can be used to scan two line images in one scanning operation throughout the whole optical systems, thereby allowing high-speed scanning to be performed practically.

In the case where the two light sources 10 and 18 are of the same wavelength, the light combining member 14 can be formed of a half mirror. For the attainment of higher light utilizing efficiency, the light combining member 14 can be formed of a polarizing mirror or a polarization beam prism.

Preferably, in the case where the light source 10 and the light source 18 are of different wavelengths, the light combining member 14 is formed of a dichroic mirror. Where the light source 10 is of a wavelength $\lambda 1$ and the light source 18 is of a wavelength $\lambda 2$, the dichroic mirror has the property of transmitting a light beam having the wavelength $\lambda 1$ and reflecting a light beam having the wavelength $\lambda 2$. This allows an optical system having high light utilizing efficiency to be realized.

(Embodiment 3)

Figure 8:
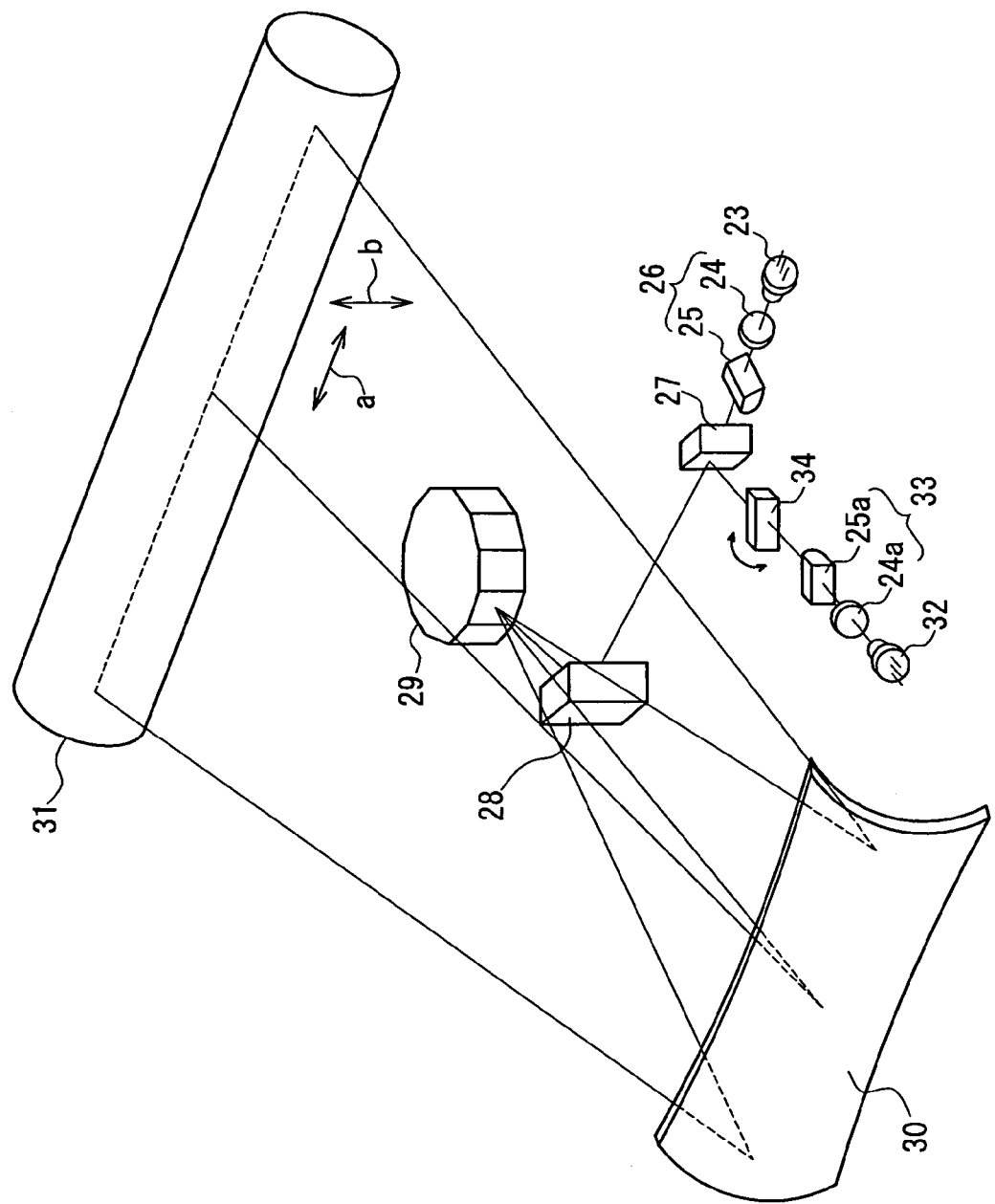
FIG. 8 is a structural view showing a main part of an optical scanner according to Embodiment 3 of the present invention.

FIG. 8 is a structural view of an optical scanner according to Embodiment 3. In this embodiment, the optical scanner includes two light sources 23 and 32, each using a semiconductor laser as a light source. A first image forming optical system 26 includes an axially symmetrical lens 24 and a cylindrical lens 25. A light beam emitted from the first image forming optical system 26 is transmitted through a light combining member 27. Then, the optical path of the light beam is bent by a returning mirror 28, so that the light beam is incident on a reflecting surface on a rotary polyhedral mirror 29. The cylindrical lens 25 has a refractive power in a direction corresponding to a sub scanning direction (direction indicated by an arrow b), and thus the light beam that has been incident on the reflecting surface on the rotary polyhedral mirror 29 is focused into a line image extended in a main scanning direction. The line image is incident on the rotary polyhedral mirror 29 in an overfilled state.

Furthermore, a second image forming optical system 33 includes an axially symmetrical lens 24a and a cylindrical lens 25a. A light beam emitted from the second image forming optical system 33 is reflected off the light combining member 27. Then, the optical path of the light beam is bent by the returning mirror 28, so that the light beam is incident obliquely on the reflecting surface on the rotary polyhedral mirror 29. The cylindrical lens 25a has a refractive power in a direction corresponding to the sub scanning direction (direction indicated by the arrow b), and thus the light beam that has been incident on the reflecting surface on the rotary polyhedral mirror 29 is focused into a line image extended in the main scanning direction. The line image is incident on the rotary polyhedral mirror 29 in an overfilled state.

As described above, the light beam emitted from the first image forming optical system 26 is transmitted through the light combining member 27, and the light beam emitted from the second image forming optical system 33 is reflected off the light combining member 27. The light beams from the respective image forming optical systems are combined by passing through the light combining member 27.

Each of the light beams deflected/reflected by the rotary polyhedral mirror 29 is incident obliquely on a curved surface mirror 30 to be converged by an optical power of the curved surface mirror 30 and then is focused to be scanned on a photosensitive drum 31 as a surface to be scanned.

In this embodiment, a sub direction light beam controller 34 is provided between the second image forming optical system 33 and the light combining member 27. The light combining member 27 combines the two light beams so that on the photosensitive drum 31, a spacing in the sub scanning direction between two scanning lines has an appropriate value with respect to the resolution.

However, since the two light beams are incident on the curved surface mirror 30 in different positions or at different angles, a deviation of a spacing in the sub scanning direction between the two scanning lines is cased at a center and both ends of an area to be scanned. It is the sub direction light beam controller 34 that corrects this deviation. By the sub direction light beam controller 34, an inclination or a height of a light beam from the light source 32 in the sub scanning direction is changed, thereby suppressing the above-mentioned deviation of a spacing between the scanning lines.

Preferably, the sub direction light beam controller 34 is formed of a galvanomirror. The galvanomirror is driven to rotate, and thus a direction in which a light beam incident on the galvanomirror is reflected can be changed, thereby allowing an inclination or a height in the sub scanning direction of the light beam to be changed.

Furthermore, the sub direction light beam controller 34 may be formed of a prism. The prism is driven to rotate, and thus a direction in which a light beam incident on the prism is refracted can be changed, thereby allowing an inclination or a height of the light beam in the sub scanning direction to be changed.

In the case where the two light sources 23 and 32 are of the same wavelength, the light combining member 27 can be formed of a half mirror. For the attainment of higher light utilizing efficiency, the light combining member 27 can be formed of a polarizing mirror or a polarization beam prism.

Preferably, in the case where the light source 23 and the light source 32 are of different wavelengths, the light combining member 27 is formed of a dichroic mirror. Where the light source 23 is of a wavelength $\lambda 1$ and the light source 32 is of a wavelength $\lambda 2$, the dichroic mirror has the property of transmitting a light beam having the wavelength $\lambda 1$ and reflecting a light beam having the wavelength $\lambda 2$. This allows an optical system having high light utilizing efficiency to be realized.

(Embodiment 4)

Figure 9:
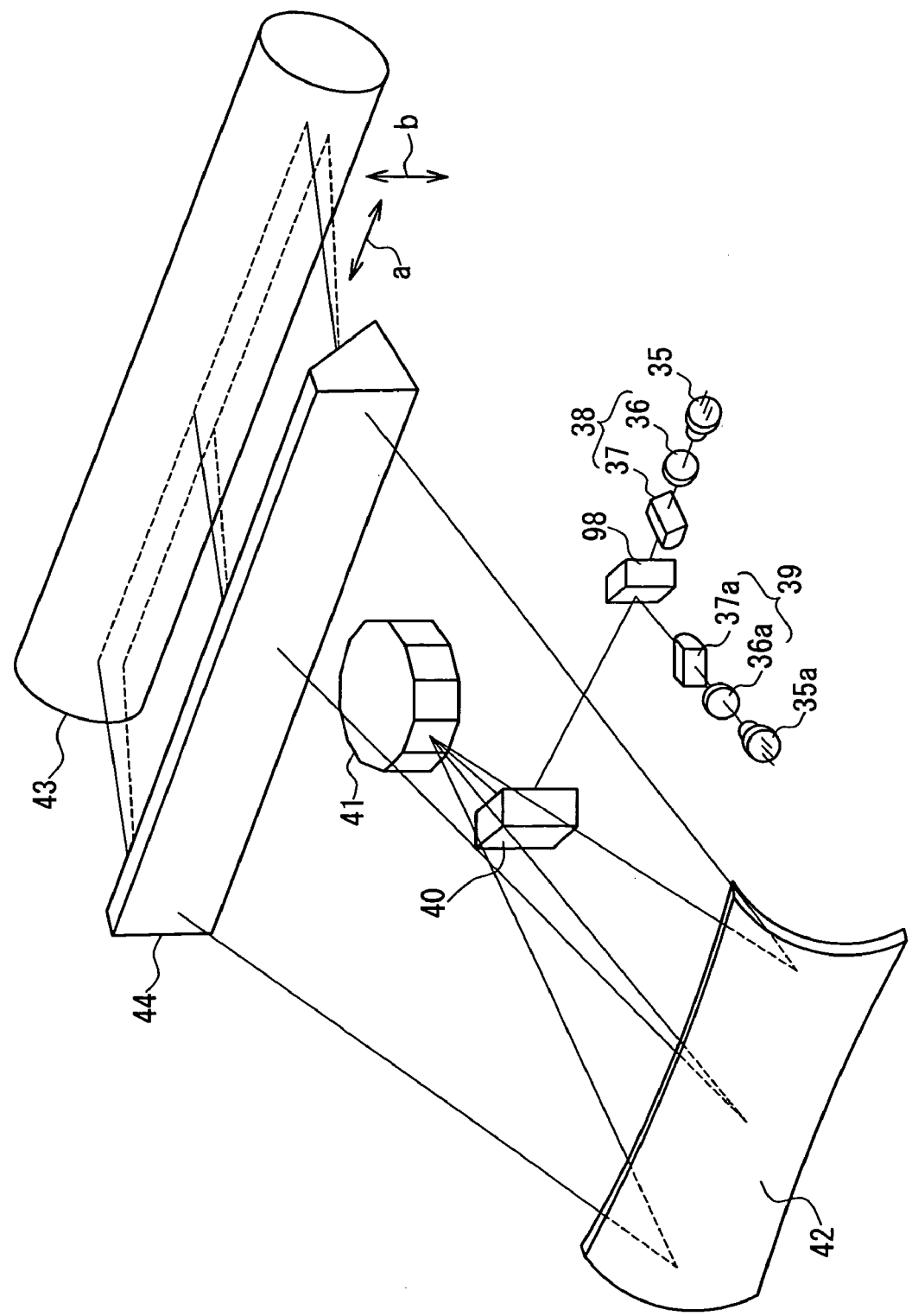
FIG. 9 is a structural view showing a main part of an optical scanner according to Embodiment 4 of the present invention.

FIG. 9 is a structural view of an optical scanner according to Embodiment 4. In this embodiment, the optical scanner includes a light source 35 that uses a semiconductor laser as a light source and emits a light beam having a wavelength $\lambda 1$, and a light source 35a that uses a semiconductor laser as a light source and emits a light beam having a wavelength $\lambda 2$.

A first image forming optical system 38 includes an axially symmetrical lens 36 and a cylindrical lens 37. A light beam emitted from the first image forming optical system 38 is transmitted through a light combining member 98. Then, the optical path of the light beam is bent by a returning mirror 40, so that the light beam is incident on a reflecting surface on a rotary polyhedral mirror 41. The cylindrical lens 37 has a refractive power in a direction corresponding to a sub scanning direction (direction indicated by an arrow b), and thus the light beam that has been incident on the reflecting surface on the rotary polyhedral mirror 41 is focused into a line image extended in a main scanning direction (direction indicated by an arrow a). The line image is incident on the rotary polyhedral mirror 41 in an overfilled state.

Furthermore, a second image forming optical system 39 includes an axially symmetrical lens 36a and a cylindrical lens 37a. A light beam emitted from the second image forming optical system 39 is reflected off the light combining member 98. Then, the optical path of the light beam is bent by the returning mirror 40, so that the light beam is incident obliquely on the reflecting surface on the rotary polyhedral mirror 41. The cylindrical lens 44 has a refractive power in a direction corresponding to the sub scanning direction, and thus the light beam that has been incident on the reflecting surface on the rotary polyhedral mirror 41 is focused into a line image extended in the main scanning direction. The line image is incident on the rotary polyhedral mirror 41 in an overfilled state.

Each of the light beams deflected/reflected by the rotary polyhedral mirror 41 is incident obliquely on a curved surface mirror 42 to be converged by an optical power of the curved surface mirror 42 and then is focused to be scanned on a photosensitive drum 43 as a surface to be scanned.

As described above, the light beam emitted from the first image forming optical system 38 is transmitted through the light combining member 98, and the light beam emitted from the second image forming optical system 39 is reflected off the light combining member 98. The light beams from the respective image forming optical systems are combined on a common axis by passing through the light combining member 98.

The light beams converged in the main scanning direction by the curved surface mirror 42 are transmitted though a prism 44 and thus are separated into two light beams. The light beams are separated by the prism 44 utilizing a fact that deflection angles are different according to a difference in wavelength. The two light beams that have been transmitted through the prism 44 are focused and scanned on the photosensitive drum 43. Thus, two line images can be scanned in one scanning operation throughout the whole optical systems, thereby allowing high-speed scanning to be performed practically.

Preferably, the wavelength dispersion and a vertex angle of the prism 44 are selected so that on the photosensitive drum 43, a spacing in the sub scanning direction between two scanning lines has an appropriate value with respect to the resolution.

Preferably, the light combining member 98 is formed of a dichroic mirror. By the use of the dichroic mirror, a light beam having the wavelength $\lambda 1$ from the light source 35 can be transmitted and a light beam having the wavelength $\lambda 2$ from the light source 35a can be reflected. This allows an optical system having high light utilizing efficiency to be realized.

(Embodiment 5)

An optical scanner according to this embodiment has the same basic configuration as that of Embodiment 4 shown in FIG. 9, and thus in this embodiment, the description is made with reference to FIG. 9. On the prism 44 as a light separator, deflected light beams are incident at an incidence angle varying according to the degree of deflection. This affects a refracting action by the prism 44, causing a deflection angle to vary, and thus a scanning line curvature may be caused.

In this case, when refracted by the prism 44, two light beams have an amount of a scanning line curvature that varies according to a difference in wavelength. Accordingly, in the case where the light beams are combined so as to have exactly the same optical path, a relative scanning line curvature further is caused on a surface to be scanned.

Preferably, in order to correct this scanning line curvature, the curved surface mirror 42 constituting the second image forming optical system is configured to cause a scanning line curvature in a reverse direction.

Figure 10:
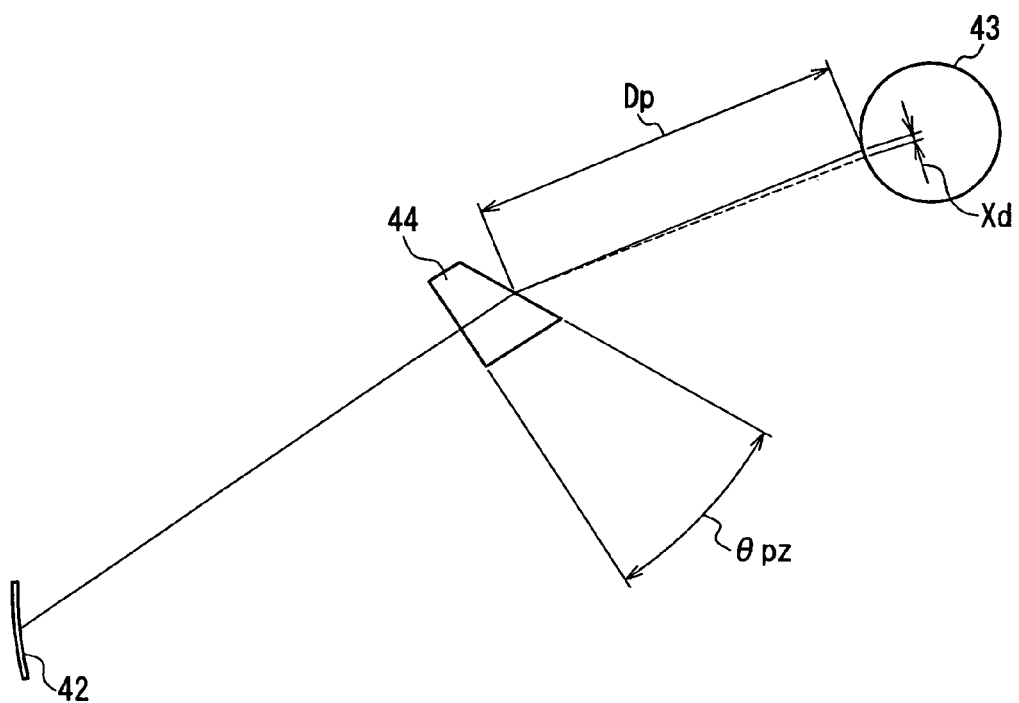
FIG. 10 is a diagrammatic view showing an optical path from a curved surface mirror to a photosensitive drum with regard to the optical scanner shown in FIG. 9.

In this embodiment, light beams are combined so that a light beam having a shorter wavelength is provided with a shift and a tilt in the sub scanning direction with respect to a light beam having a longer wavelength, thereby allowing a relative scanning line curvature to be corrected. FIG. 10 shows an optical path in a cross section in the sub scanning direction from the curved surface mirror 42 to the photosensitive drum 43. In the figure, θpz denotes an angle formed between an incidence surface and an emitting surface of the prism 44, namely a vertex angle of the prism, and Dp denotes a distance from the emitting surface of the prism 44 to an image plane.

Light beams from the two light sources are combined so as to have exactly the same optical path on a common axis and then are incident on the curved surface mirror 42. Subsequently, the light beams are reflected off the curved surface mirror 42 and then are incident on the prism 44. In this case, assuming that the incidence surface of the prism 44 is disposed perpendicularly in the sub scanning direction with respect to the light beams, a spacing x0 in the sub scanning direction between positions on which the two light beams are focused, respectively, at a scanning center on the surface to be scanned can be represented by the following expression (12).

In the following expression, n1 denotes a refractive index at a wavelength λ1 of a material constituting the prism 44, n2 denotes a refractive index at a wavelength λ2 of the material, and θA and θB are represented respectively by the following expressions (13) and (14).

$x0 = Dp \cdot \cos(\theta A)\{\tan(\theta B) - \tan(\theta A)\}$ \hfill Expression (12)

$\theta A = \sin^{-1}\{n1 \cdot \sin(\theta pz)\} - \theta pz$ \hfill Expression (13)

$\theta B = \sin^{-1}\{n2 \cdot \sin(\theta pz)\} - \theta pz$ \hfill Expression (14)

Thus, where a spacing in the sub scanning direction between positions on the photosensitive drum 43, on which light beams having the respective wavelengths are focused, respectively, at a scanning center is indicated as xd, the following expression (15) is satisfied, and thus a relative scanning line curvature caused between scanning lines can be brought to a state of being corrected, thereby allowing higher resolution to be realized.

$Dp \cdot \cos(\theta A)\{\tan(\theta B) - \tan(\theta A)\} < xd$ \hfill Expression (15)

That is, Dp, θA and θB are set so that the expression (15) is satisfied. Thus, light beams can be combined so that a light beam having a shorter wavelength is provided with a shift and a tilt in the sub scanning direction in a direction allowing a relative scanning line curvature caused in the prism 44 to be corrected. As a result, the relative scanning line curvature can be corrected in a state where x0<xd.

(Embodiment 6)

Figure 11:
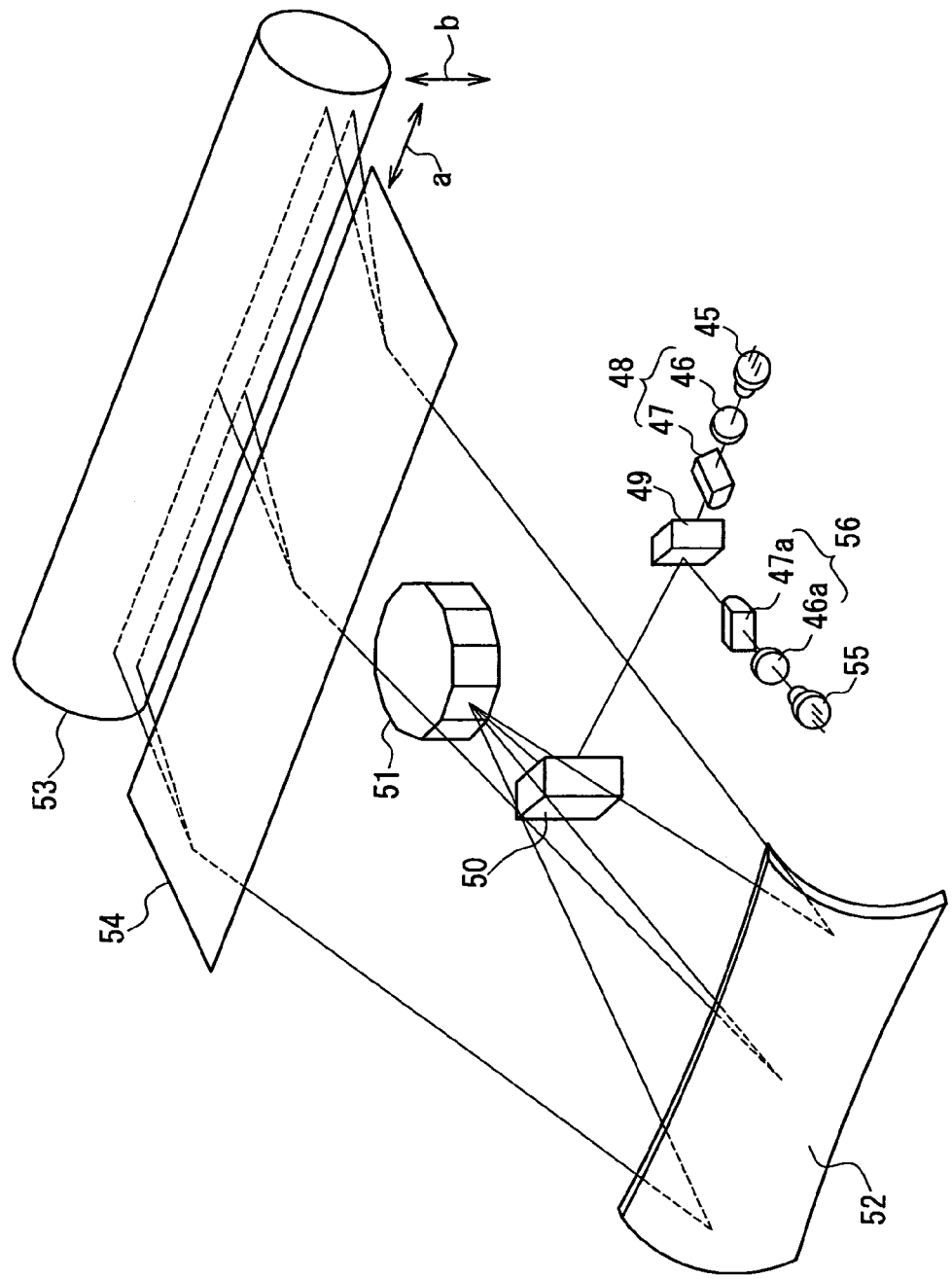
FIG. 11 is a structural view showing a main part of an optical scanner according to Embodiment 6 of the present invention.

FIG. 11 is a structural view of an optical scanner according to Embodiment 6. In this embodiment, the optical scanner includes a light source 45 that uses a semiconductor laser as a light source and emits a light beam having a wavelength λ1, and a light source 55 that uses a semiconductor laser as a light source and emits a light beam having a wavelength λ2

A first image forming optical system 48 includes an axially symmetrical lens 46 and a cylindrical lens 47. A light beam emitted from the first image forming optical system 48 is transmitted through a light combining member 49. Then, the optical path of the light beam is bent by a returning mirror 50, so that the light beam is incident on a reflecting surface on a rotary polyhedral mirror 51. The cylindrical lens 47 has a refractive power in a direction corresponding to a sub scanning direction (direction indicated by an arrow b), and thus the light beam that has been incident on the reflecting surface on the rotary polyhedral mirror 51 is focused into a line image extended in a main scanning direction (direction indicated by an arrow a). The line image is incident on the rotary polyhedral mirror 51 in an overfilled state.

Furthermore, a second image forming optical system 56 includes an axially symmetrical lens 46a and a cylindrical lens 47a. A light beam emitted from the second image forming optical system 56 is reflected off the light combining member 49. Then, the optical path of the light beam is bent by the returning mirror 50, so that the light beam is incident obliquely on the reflecting surface on the rotary polyhedral mirror 51. The cylindrical lens 47a has a refractive power in a direction corresponding to the sub scanning direction, and thus the light beam that has been incident on the reflecting surface on the rotary polyhedral mirror 51 is focused into a line image extended in the main scanning direction. The line image is incident on the rotary polyhedral mirror 51 in an overfilled state.

Each of the light beams deflected/reflected by the rotary polyhedral mirror 51 is incident obliquely on a curved surface mirror 52 to be converged by an optical power of the curved surface mirror 52 and then is focused to be scanned on a photosensitive drum 53 as a surface to be scanned.

As described above, the light beam emitted from the first image forming optical system 48 is transmitted through the light combining member 49, and the light beam emitted from the second image forming optical system 56 is reflected off the light combining member 49. The light beams from the respective image forming optical systems are combined on a common axis by passing through the light combining member 49.

The optical scanner according to this embodiment includes a flat-shaped light separator 54. The light beams converged in the main scanning direction by the curved surface mirror 52 are separated by the flat-shaped light separator 54 into two-light beams having the wavelength λ1 and the wavelength λ2, respectively. The light beams obtained by the separation are focused to be scanned respectively on the photosensitive drum 53. The flat-shaped light separator 54 is set so that on the photosensitive drum 53, a spacing in the sub scanning direction between two scanning lines has an appropriate value with respect to the resolution.

Thus, light beams having different wavelengths emitted respectively from the two light sources 45 and 55 can be used to scan two line images in one scanning operation throughout the whole optical systems, thereby allowing high-speed scanning to be performed practically.

Figure 12:
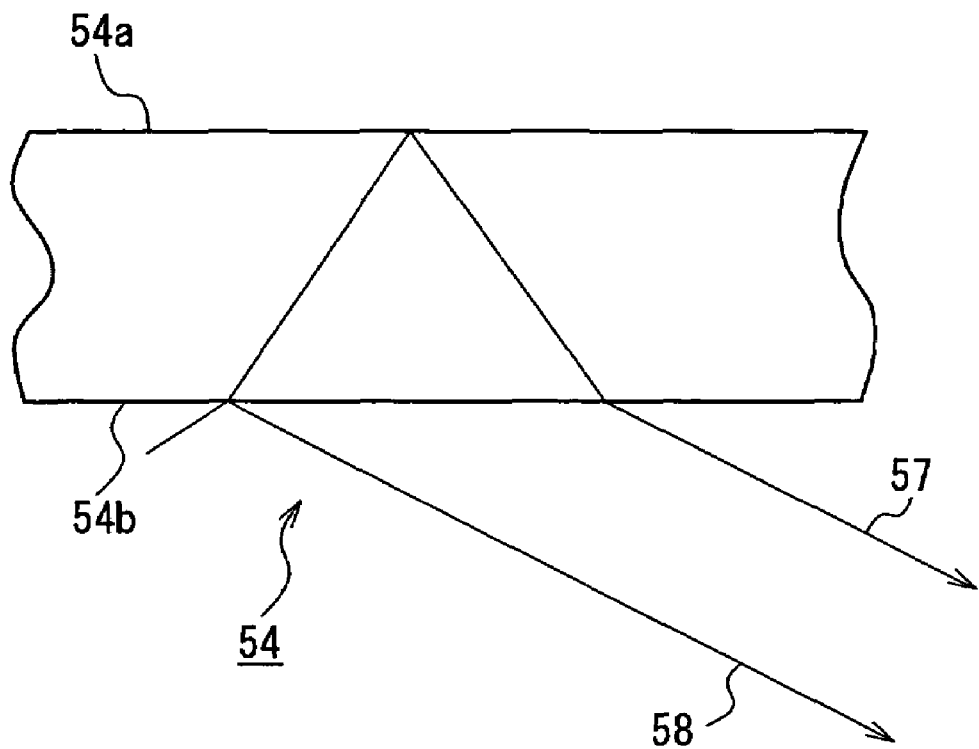
FIG. 12 is a structural view showing separation of light beams by a flat-shaped light separator that is formed of a dicroic mirror with regard to the optical scanner shown in FIG. 11.

Preferably, the flat-shaped light separator 54 is formed of a dichroic mirror. FIG. 12 is a partially expanded view of the flat-shaped light separator 54 formed of a dichroic mirror. A dichroic mirror surface is configured as an incidence surface 54b, and a metallic reflecting film is formed on a surface 54a on an opposite side.

Of the two light beams having different wavelengths that are arrayed on the common axis by the light combining member 49, the light beam having the wavelength λ1 from the light source 45 is transmitted through the incidence surface 54b to be reflected off the surface 54a on the opposite side. Then, the light beam is emitted toward the air from a rear side of the incidence surface 54b to be turned into an emitted light beam 57 and directed to the photosensitive drum 53. The light beam having the wavelength λ2 from the light source 55 is turned into a reflected light beam 58 on the incidence surface 54b and directed to the photosensitive drum 53. Thus, higher light utilizing efficiency can be attained.

The surface 54a may be configured as a dichroic mirror surface in place of the surface with the metallic reflecting film. Further, in the flat-shaped light separator 54 shown in FIG. 12, the incidence surface 54b and the surface 54a on the opposite side are parallel to each other. However, these surfaces may be non-parallel to each other by being formed in a wedge shape.

Furthermore, the flat-shaped light separator 54 formed of a diffracting element allows a configuration to be simplified. That is, of light beams having two different wavelengths incident on the diffracting element, a light beam having a shorter wavelength is diffracted to a greater degree, and by utilizing this diffracting action, the two light beams having different wavelengths combined on a common axis can be separated into two. Moreover, an aberration also can be corrected by the diffracting element.

(Embodiment 7)

Figure 13:
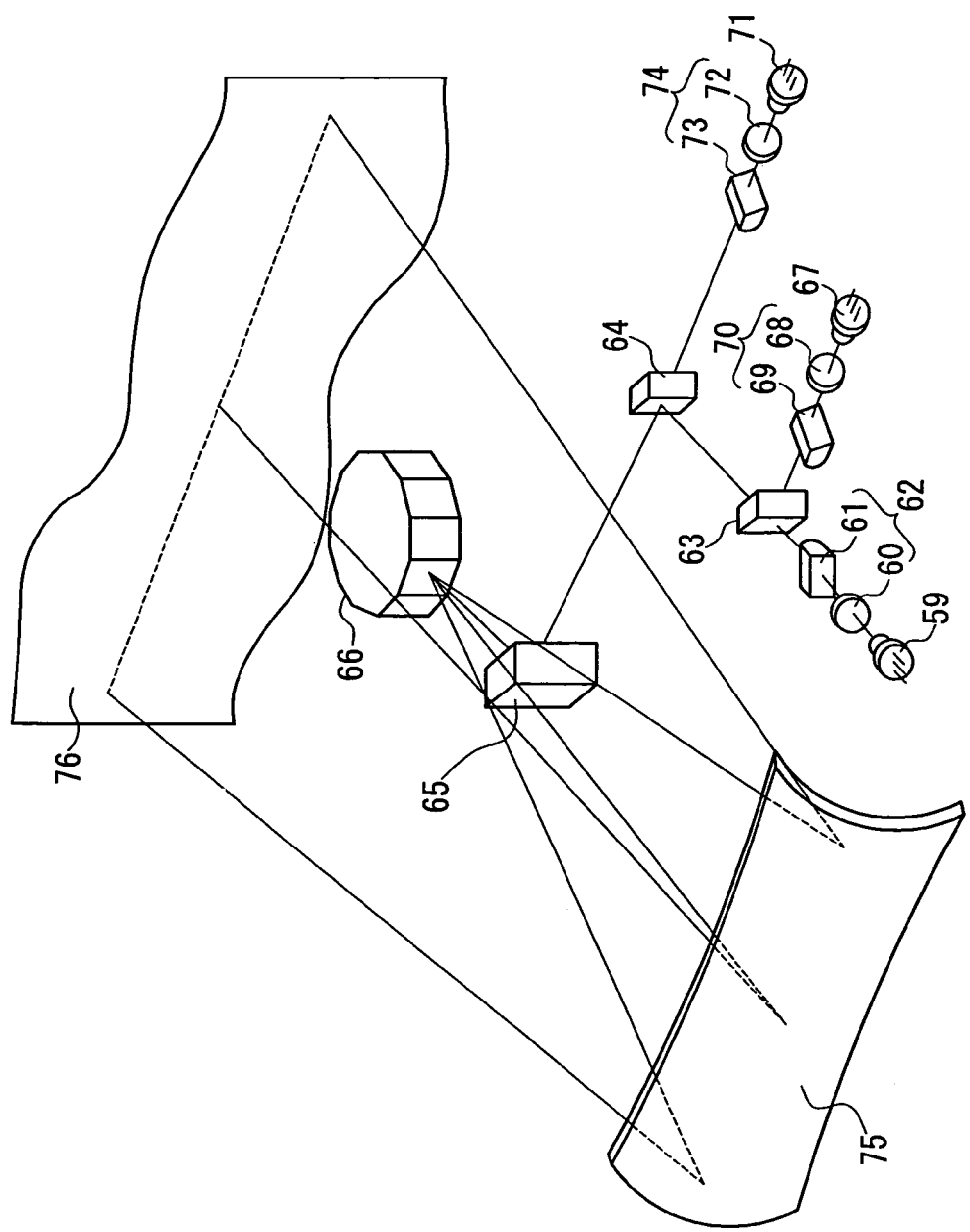
FIG. 13 is a structural view showing a main part of an optical scanner according to Embodiment 7 of the present invention.

FIG. 13 is a structural view of an optical scanner according to Embodiment 7. The optical scanner according to this embodiment includes a light source 59 that emits a light beam having a wavelength λ1, a light source 67 that emits a light beam having a wavelength λ2, and a light source 71 that emits a light beam having a wavelength λ3.

A first image forming optical system 62 includes an axially symmetrical lens 60 and a cylindrical lens 61. A light beam emitted from the first image forming optical system 62 is transmitted through a light combining member 63 to be reflected off a light combining member 64 in a direction of a returning mirror 65.

A second image forming optical system 70 includes an axially symmetrical lens 68 and a cylindrical lens 69. A light beam emitted from the second image forming optical system 70 is reflected off the light combining member 63 and further is reflected off the light combining member 64 in the direction of the returning mirror 65.

A third image forming optical system 74 includes an axially symmetrical lens 72 and a cylindrical lens 73. A light beam emitted from the third image forming optical system 74 is transmitted through the light combining member 64 and travels in the direction of the returning mirror 65.

The light beams from the respective image forming optical systems are combined on a common axis at a point in time when the light beams pass through the light combining member 64. The optical paths of the light beams are bent by the returning mirror 65, and the light beams are incident obliquely on a reflecting surface on a rotary polyhedral mirror 51.

The cylindrical lenses 61, 69 and 73 have a refractive power in a direction corresponding to a sub scanning direction (direction indicated by an arrow b), and thus each of the light beams that have been incident on the reflecting surface on the rotary polyhedral mirror 66 is focused into a line image extended in a main scanning direction (direction indicated by an arrow a). Further, each of the light beams is incident on the rotary polyhedral mirror 66 in an overfilled state.

Each of the light beams deflected/reflected by the rotary polyhedral mirror 66 is incident obliquely on a curved surface mirror 75 to be converged in the main scanning direction by an optical power of the curved surface mirror 75 and then, while maintaining coaxiality, is focused to be scanned on a surface 76 to be scanned.

Preferably, each of the light combining member 63 and 64 is formed of a dichroic mirror. By the use of the dichroic mirror, higher light utilizing efficiency can be attained. Further, the light combining member 63 can be set to have the property of transmitting a light beam having the wavelength λ1 and reflecting a light beam having the wavelength λ2, and the light combining member 64 can be set to have the property of transmitting a light beam having the wavelength λ3 and reflecting light beams having the wavelengths λ1 and λ2.

In this embodiment, the light beams having three different wavelengths can be emitted. By setting the wavelengths of the light beams to correspond to three primary colors or complementary colors of the three primary colors, a material to be scanned that is the surface 76 to be scanned can be formed of a photographic paper sheet. For example, the wavelengths λ1, λ2 and λ3 should be set to a wavelength near 680 nm, a wavelength near 530 nm, and a wavelength near 450 nm, respectively. In this case, by selecting a property of the dichroic mirror as the light combining member, it can be selected arbitrarily which light source should be used as each of light sources emitting light beams having the respective wavelengths.

Furthermore, with the light sources each formed of a semiconductor laser, the optical scanner not only can be reduced in size but also can be of a simple system that allows modulation to be performed directly using a predetermined writing signal.

Figure 14:
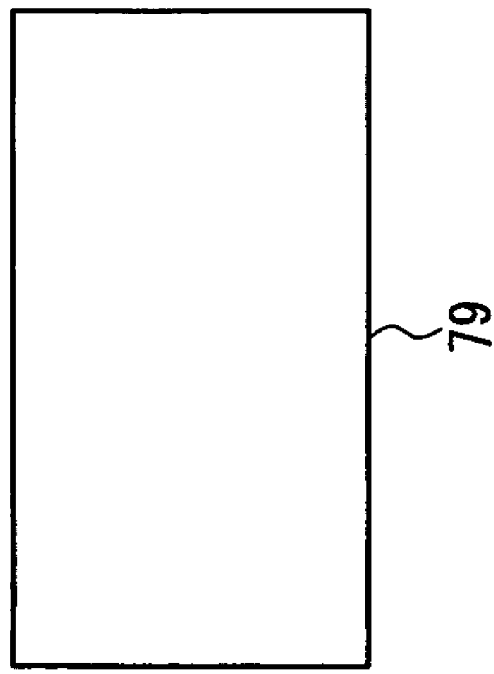
FIG. 14 is a structural view of a part of an optical system constituting a light source of the optical scanner shown in FIG. 13.
Figure 14:
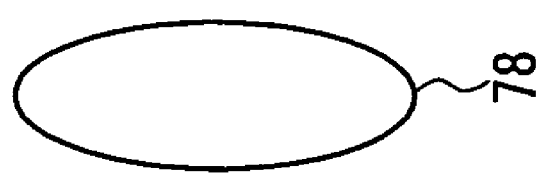
Figure 14:
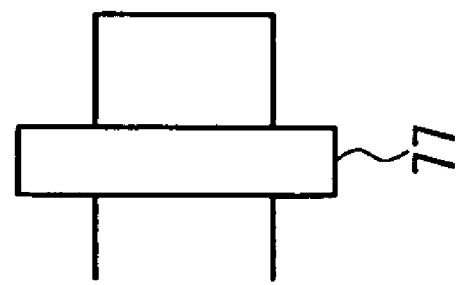

FIG. 14 is a structural view showing a part of an optical system constituting a light source part. A light beam emitted from a semiconductor laser 77 as a light source is incident efficiently on a wavelength converting element 79 by means of a collective lens 78. A wavelength λL1 of the light beam emitted from the semiconductor laser 77 is converted to a wavelength λL2 by the wavelength converting element 79. With a wavelength converting element that can double a frequency, the wavelength λL2 is converted to a wavelength half the wavelength λL1. According to the optical system described above, by the use of a less costly, high-power semiconductor laser having an oscillation wavelength in the near-infrared region, particularly, a light beam having a wavelength near 530 nm and a light beam having a wavelength near 450 nm that are required for the three primary colors and the complementary colors of the three primary colors can be obtained.

Figure 15:
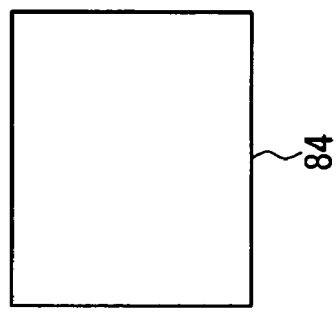
FIG. 15 is a structural view of another example of the part of the optical system constituting the light source of the optical scanner shown in FIG. 13.
Figure 15:
Figure 15:
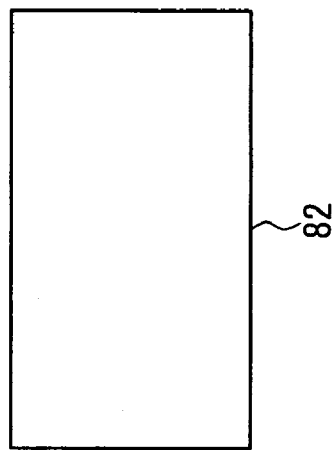
Figure 15:
Figure 15:
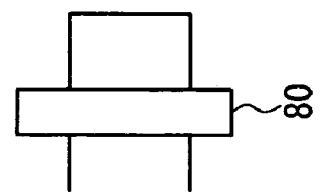

FIG. 15 is a structural view showing another example of the part of the optical system constituting the light source part. A light beam emitted from a semiconductor laser 80 as a light source is incident efficiently on a wavelength converting element 82 by means of a first collective lens 81. The light beam whose wavelength has been converted is incident efficiently on an acousto-optic converting element 84 by means of a second collective lens 83. According to this configuration, a wavelength λL1 of the light beam emitted from the semiconductor laser 80 is converted to a wavelength λL2 by the wavelength converting element 82. With a wavelength converting element that can double a frequency, the wavelength λL2 is converted to a wavelength half the wavelength λL1. According to the optical system described above, with the use of a less costly, high-power semiconductor laser having an oscillation wavelength in the near-infrared region, particularly, a light beam having a wavelength near 530 nm and a light beam having a wavelength near 450 nm that are required for the three primary colors and the complementary colors of the three primary colors can be obtained.

Moreover, the acousto-optic converting element 84 is driven using a predetermined writing signal, and thus, while the semiconductor laser 80 performs continuous oscillation, optical writing can be performed. Generally, wavelength converting elements can operate more stably in the case of converting a wavelength of a light beam originating in continuous oscillation than in the case of converting a wavelength of a light beam originating in intermittent oscillation. Further, a gas laser that emits a high-power light beam also may be used as a light source.

(Embodiment 8)

Figure 16:
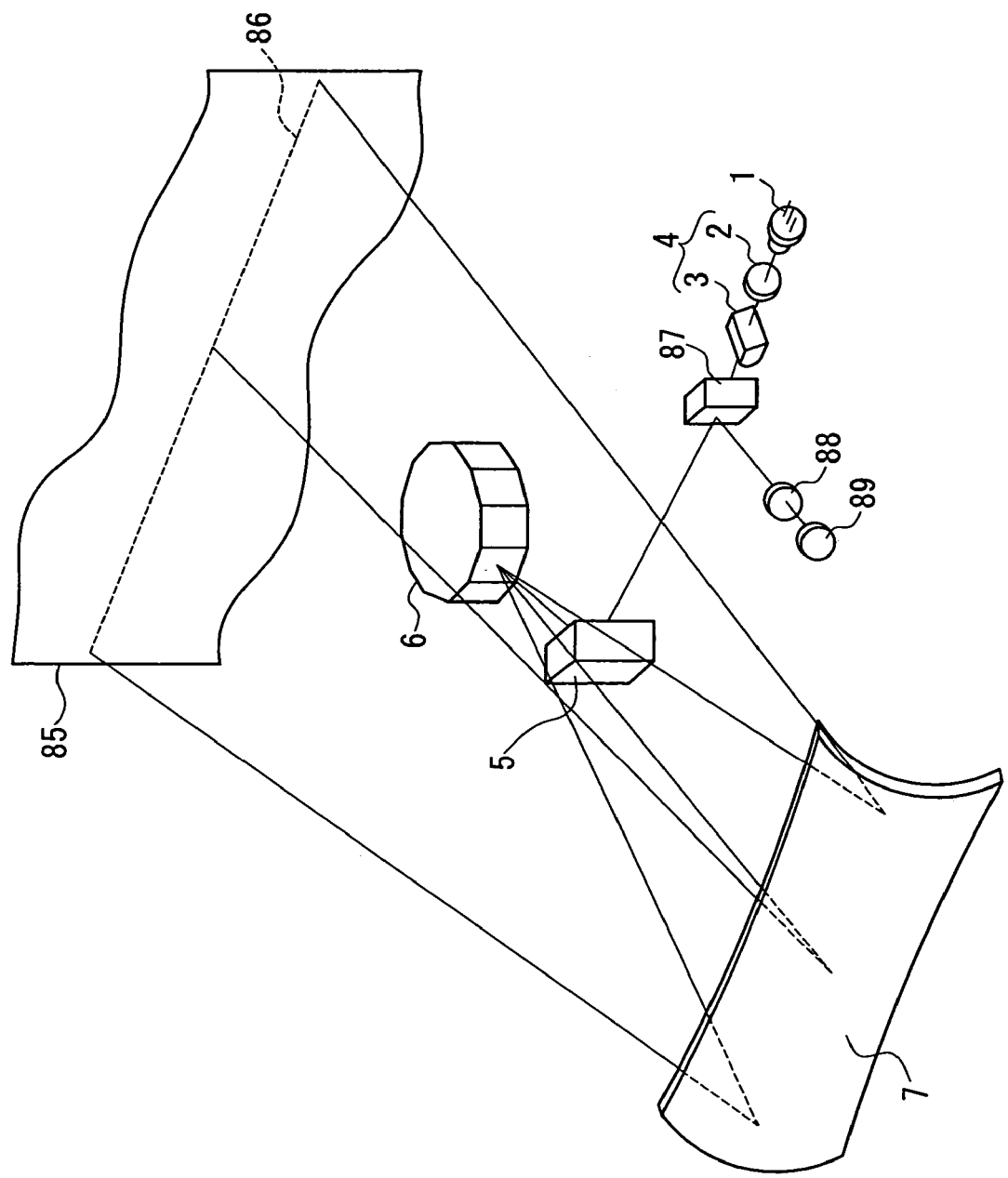
FIG. 16 is a structural view of a main part of an image reading apparatus using an optical scanner according to Embodiment 8 of the present invention.

FIG. 16 is a structural view of an embodiment according to an image reading apparatus. The image reading apparatus according to this embodiment uses the optical scanner according to Embodiment 1. A light beam emitted from the first image forming optical system 4 is transmitted through a half mirror 87. Then, the optical path of the light beam is bent by the returning mirror 5, so that the light beam is incident on the reflecting surface of the rotary polyhedral mirror 6.

The light beam deflected/reflected by the rotary polyhedral mirror 6 is focused at the curved surface mirror 7. Then, the light beam is used for scanning a part 86 to be read on a document 85 to be read as a surface to be scanned. Reflected light or scattered light carrying information on a surface to be read passes along a reverse optical path and reaches the half mirror 87 via the curved surface mirror 7. Returned light is reflected off the half mirror 87 to be focused on a light detector 89 by means of a collective lens 88. The image reading apparatus according to this embodiment uses the optical scanner according to Embodiment 1, and thus a high-resolution image reading apparatus can be realized that achieves size and cost reductions.

(Embodiment 9)

Figure 17:
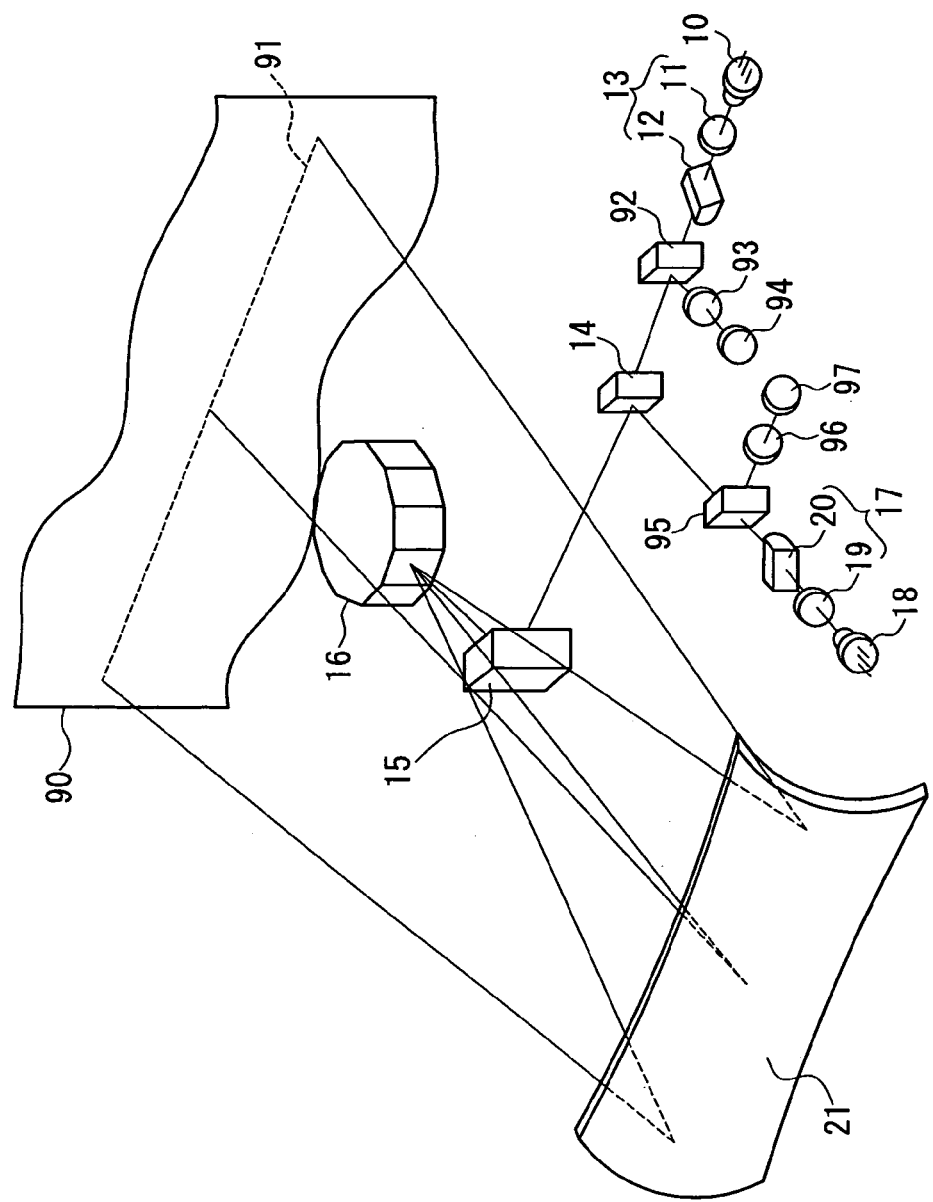
FIG. 17 is a structural view of a main part of an image reading apparatus using an optical scanner according to Embodiment 9 of the present invention.

FIG. 17 is a structural view of another embodiment according to the image reading apparatus. The image reading apparatus according to this embodiment uses the optical scanner according to Embodiment 2 shown in FIG. 7. A light beam emitted from the first image forming optical system 13 is transmitted through a half mirror 92 and the light combining member 14. Then, the optical path of the light beam is bent by the returning mirror 15, so that the light beam is incident on the reflecting surface of the rotary polyhedral mirror 16.

Furthermore, a light beam emitted from the second image forming optical system 17 is transmitted though a half mirror 95 to be reflected off the combining member 14. The optical path of the light beam is bent by the returning mirror 15, so that the light beam is incident obliquely on the rotary polyhedral mirror 16.

Each of the light beams deflected/reflected by the rotary polyhedral mirror 16 is incident obliquely on the curved surface mirror 21 to be converged in the main scanning direction by an optical power of the curved surface mirror 21. With respect to a portion 91 to be read on a document 90 to be read as a surface to be scanned, two line images can be scanned simultaneously with scanning light of two different wavelengths.

Reflected light or scattered light carrying information on a surface to be read, which has been read using the light beam from the light source 10, passes along a reverse optical path and reaches the half mirror 92 via the curved surface mirror 21 and the combining member 14. Returned light is reflected off the half mirror 92 to be focused on a light detector 94 by means of a collective lens 93.

Meanwhile, reflected light or scattered light carrying information on the surface to be read, which has been read using the light beam from the light source 18, also passes along the reverse optical path and reaches the combining member 14 via the curved surface mirror 21. Returned light is reflected off the combining member 14 and further reflected off a half mirror 95 to be focused on a light detector 97 by means of a collective lens 96. Thus, also in this embodiment, two line images can be scanned simultaneously, thereby allowing a high-resolution image reading apparatus to be realized that can perform a high-speed operation and achieves size and cost reductions.

In this embodiment, the description was directed to the embodiment of the image reading apparatus using the optical scanner according to Embodiment 2. However, the optical scanners according to Embodiments 3 to 6 also may be used.

(Embodiment 10)

Figure 18:
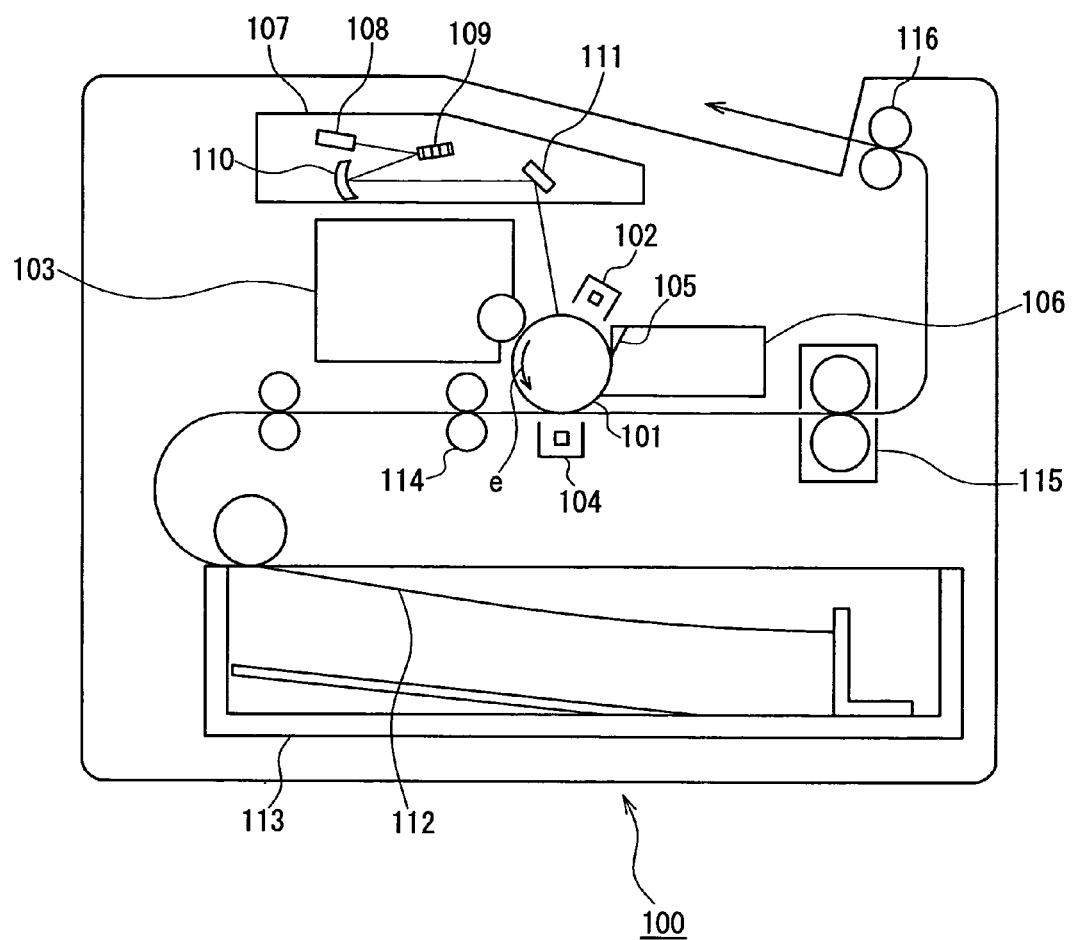
FIG. 18 is a structural view of a main part of an image forming apparatus to which the optical scanner according to the present invention is applied.

FIG. 18 is a structural view showing an embodment according to an image forming apparatus. The image forming apparatus shown in this figure uses any of the optical scanners according Embodiments 1 to 6.

A photosensitive drum 101 that is driven to rotate in a direction indicated by an arrow e is disposed at substantially a center of an inner portion of a main body 100 of the apparatus. A charger 102, a developer 103, a transferer 104 and a cleaner 106 with a blade 105 for scraping off a toner remaining on the photosensitive drum 101 are arranged around the periphery of the photosensitive drum 101.

A light beam from an optical scanner 107 is incident to be scanned on a surface of the photosensitive drum 101 charged to a desired potential by the charger 102. Thus, a desired image can be formed as a latent image. This latent image is developed into a toner image by the developer 103.

In the optical scanner 107, in an overfilled state, a light beam emitted from a first image forming optical system 108 is incident on a rotary polyhedral mirror 109 as a line image. The incident light beam is deflected by the rotary polyhedral mirror 109, and the deflected light beam is focused to be scanned on the photosensitive drum 101 by a curved surface mirror 110. The light beam is bent in a predetermined direction by a reflecting mirror 111, and thus the arrangement of the optical scanner in the main body can be optimized.

Concurrently with the progress of this developing process, a recording paper sheet 112 is fed one by one from a paper feeding cassette 113 provided in a lower portion of the main body 100 of the apparatus, and then conveyed to a transferring part via a timing roller 114. In the transferring part, a toner image is transferred onto the recording paper sheet and fixed by a fixer 115. After the image is fixed, the recording paper sheet is ejected from an ejecting roller 116 to an upper surface of the main body 100.

As described above, by the use of the above-mentioned optical scanners according to Embodiments 1 to 6, a high-resolution image forming apparatus can be realized that can perform a high-speed operation and achieves size and cost reductions.

(Embodiment 11)

Figure 19:
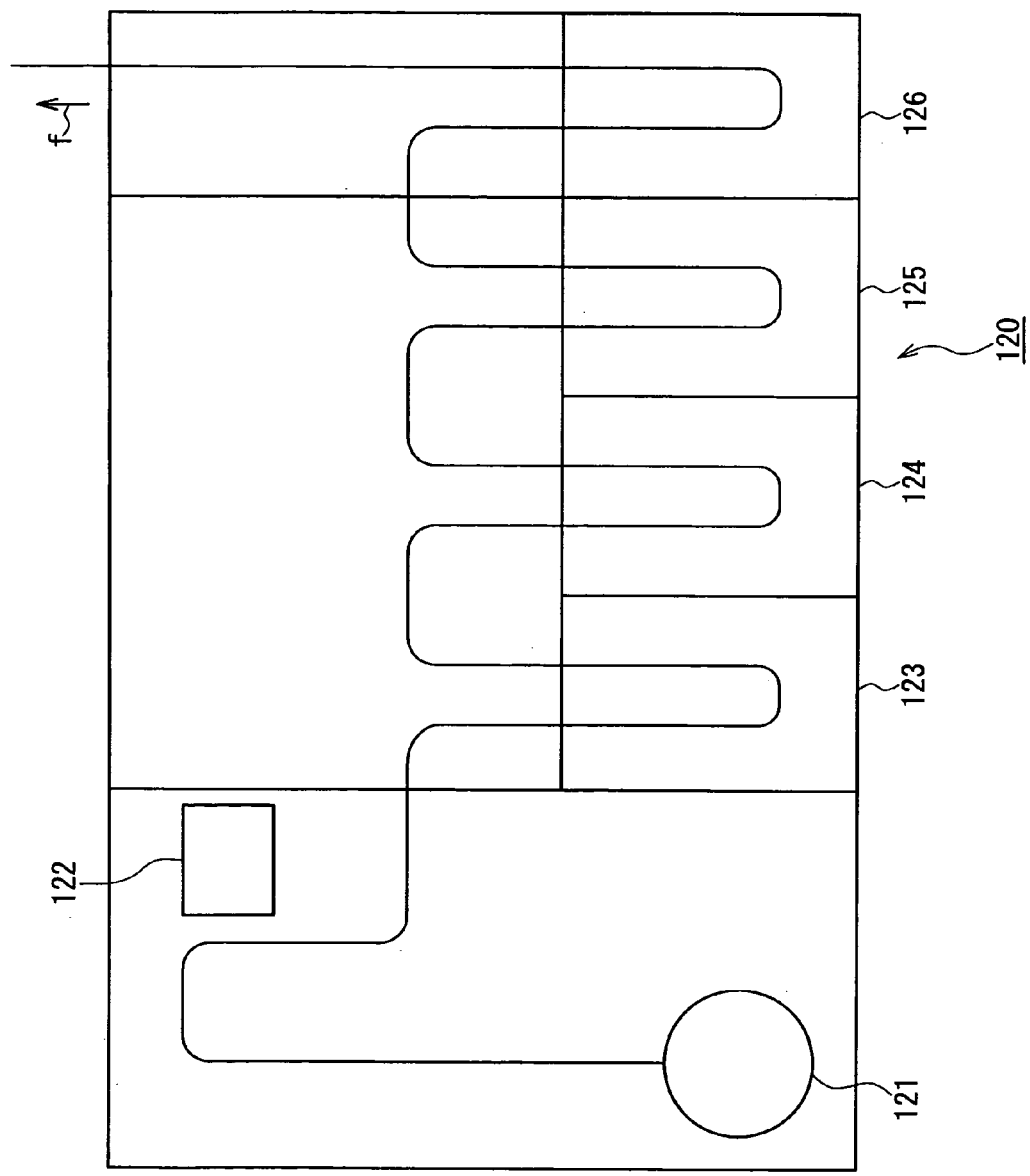
FIG. 19 is a structural view of a main part of a photographic processing apparatus to which the optical scanner according to the present invention is applied.

FIG. 19 is a structural view of an embodiment according to a photographic processing apparatus. A photographic processing apparatus 120 shown in this figure includes an optical scanner 122 having the same configuration as that described with regard to Embodiment 7. By the optical scanner 122, a roll-shaped photographic paper sheet 121 is exposed to light beams obtained by combining on a common axis, light of three different wavelengths required for three primary colors or complementary colors of the three primary colors. The photographic paper sheet 121 that has been exposed to the light is passed through a developing tank 123, a stopping tank 124 and a fixing tank 125, so that an exposed image that has been written by optical writing can be made manifest. The photographic paper sheet dried in a drying tank 126 is ejected in a direction indicated by an arrow f from the photographic processing apparatus 120. After that, the paper sheet is cut into a predetermined shape using a cutter (now shown). The photographic processing apparatus 120 uses the optical scanner 122 having the same configuration as that described with regard to Embodiment 7, and thus a high-resolution photographic processing apparatus can be realized that can perform a high-speed operation and achieves size and cost reductions.

INDUSTRIAL APPLICABILITY

As described in the foregoing discussion, the optical scanner according to the present invention can perform high-speed scanning while securing excellent optical performance at a reduced cost. Thus, the optical scanner can be used in image reading apparatus such as a laser printer, a laser facsimile, a digital copier and the like, image forming apparatus or photographic processing apparatus.

The invention claimed is:

1. An optical scanner that scans a light beam on a surface to be scanned in a main scanning direction and a sub scanning direction orthogonal to the main scanning direction, comprising:
   a light source;
   a rotary polyhedral mirror that scans a light beam from the light source;
   an image forming optical system that is disposed between the light source and the rotary polyhedral mirror and forms a line image larger in size than a width in the main scanning direction of one reflecting surface of the rotary polyhedral mirror on the reflecting surface; and
   a curved surface mirror that is disposed between the rotary polyhedral mirror and the surface to be scanned,
   wherein the light source, the image forming optical system, the rotary polyhedral mirror and the curved surface mirror are arranged respectively in different positions in the sub scanning direction,
   a light beam from the image forming optical system is incident on the reflecting surface of the rotary polyhedral mirror obliquely with respect to a first plane that includes a normal of the reflecting surface and is parallel to the main scanning direction, and
   a light beam reflected off the rotary polyhedral mirror is incident on the curved surface mirror obliquely with respect to a second plane that includes a normal at a vertex of the curved surface mirror and is parallel to the main scanning direction.

2. The optical scanner according to claim 1,
wherein where an angle formed between a center axis of a light beam directed toward the curved surface mirror and the second plane is indicated as $\theta M$ (°), the optical scanner satisfies a relationship represented by $6 < \theta M < 10$.

3. The optical scanner according to claim 1,
wherein where in the sub scanning direction, a direction of an angle that the reflected light beam from the rotary polyhedral mirror forms with respect to the incident light beam from the image forming optical system is defined as a positive direction,
in the sub scanning direction, a reflected light beam from the curved surface mirror forms an angle in a negative direction with respect to the incident light beam from the rotary polyhedral mirror.

4. The optical scanner according to claim 3,
wherein where an absolute value of an angle that the normal of the reflecting surface of the rotary polyhedral mirror forms with the incident light beam from the image forming optical system is indicated as $\theta P$ (°), and
an absolute value of an angle that the normal at the vertex of the curved surface mirror forms with the reflected light beam from the rotatable polyhedral mirror is indicated as $\theta M$ (°),
the optical scanner satisfies a relationship represented by $1.3 < \theta M / \theta P < 1.7$.

5. The optical scanner according to claim 3,
wherein where a distance between the reflecting surface of the rotary polyhedral mirror and the vertex of the curved surface mirror is indicated as L, and a distance between the vertex of the curved surface mirror and the surface to be scanned is indicated as D,
the optical scanner satisfies a relationship represented by $0.3 < L/(L+D) < 0.55$.

6. The optical scanner according to claim 3,
wherein where the curved surface mirror has a radius of curvature in the main scanning direction that is indicated as Rdy and a radius of curvature in the sub scanning direction that is indicated as RDx, and a distance between the vertex of the curved surface mirror and the surface to be scanned is indicated as D,
the optical scanner satisfies relationships represented respectively by $0.7 < 2D/|RDy| < 1.3$, and $2.2 < RDy/RDx < 3.2$.

7. The optical scanner according to claim 1,
wherein the curved surface mirror has a circular arc shape in cross section in the sub scanning direction.

8. The optical scanner according to claim 1,
wherein the curved surface mirror has a shape that allows correction for a curve in a scanning line caused due to oblique light incidence.

9. The optical scanner according to claim 1,
wherein the curved surface mirror is asymmetrical with respect to the second plane.

10. The optical scanner according to claim 1,
wherein the curved surface mirror has a twisted shape such that on a generatrix that is a curve where the second plane and a curved surface of the curved surface mirror intersect each other, normals at points other than the vertex of the curved surface mirror are not included in the second plane.

11. The optical scanner according to claim 10,
wherein an angle that each of the normals at the points on the generatrix forms with the second plane is increased in a direction toward a periphery of the curved surface mirror.

12. The optical scanner according to claim 10,
wherein where a direction of an angle that the reflected light beam from the rotary polyhedral mirror forms with respect to the incident light beam on the rotary polyhedral mirror is defined as a positive direction, each of the normals at the points on the generatrix forms an angle in the positive direction with respect to the second plane.

13. The optical scanner according to claim 1,
wherein the curved surface mirror is formed of an anamorphic mirror having a radius of curvature at the vertex in the main scanning direction that is different from a radius of curvature at the vertex in the sub scanning direction.

14. The optical scanner according to claim 1,
wherein the curved surface mirror has a concave shape in each of the main scanning direction and the sub scanning direction.

15. The optical scanner according to claim 1,
wherein the curved surface mirror has a shape such that an optical power generated by reflection in the sub scanning direction is changed in level between in a central portion and in a peripheral portion in the main scanning direction.

16. The optical scanner according to claim 1,
wherein the curved surface mirror has a shape such that a radius of curvature of the curved surface mirror in cross section in the sub scanning direction does not depend on a shape of the curved surface mirror in cross section in the main scanning direction.

17. The optical scanner according to claim 1,
wherein in the image forming optical system, the light beam from the light source is converged in the main scanning direction.

18. The optical scanner according to claim 1,
wherein in the image forming optical system, the light beam from the light source diverges in the main scanning direction.

19. The optical scanner according to claim 1, further comprising a wavelength changeable light source and a wavelength controlling part.

20. The optical scanner according to claim 1,
wherein the number of the light sources is two or higher, and the optical scanner further comprises a light combining member that is disposed between the light source and the rotary polyhedral mirror and combines light beams from the light sources so that a spacing in the sub scanning direction between beam spots formed on the surface to be scanned has a predetermined value.

21. The optical scanner according to claim 20,
further comprising a sub direction light beam controller that is disposed between the light source and the rotary polyhedral mirror and changes a tilt or a height in the sub scanning direction of at least one of the light beams from the light sources.

22. The optical scanner according to claim 20,
wherein the light combining member is formed of a dichroic mirror.

23. The optical scanner according to claim 21,
wherein the sub direction light beam controller is formed of a galvanomirror.

24. The optical scanner according to claim 21,
wherein the sub direction light beam controller is formed of a prism.

25. The optical scanner according to claim 1,
wherein the number of the light sources is two or higher, the light sources being of different wavelengths, and the optical scanner further comprises a light combining member that is disposed between the light source and the rotary polyhedral mirror and combines light beams from the light sources on a common axis, and a light separator that is disposed between the rotary polyhedral mirror and the surface to be scanned and separates light beams.

26. The optical scanner according to claim 25,
wherein the light separator is formed of a prism.

27. The optical scanner according to claim 25,
wherein the light combining member is formed of a dichroic mirror.

28. The optical scanner according to claim 1,
wherein the number of the light sources is two or a higher, the light sources being of different wavelengths, and the optical scanner further comprises a light combining member that is disposed between the light source and the rotary polyhedral mirror and combines light beams from the light sources so that a spacing in the sub scanning direction between beam spots formed on the surface to be scanned has a predetermined value, and a light separator that is disposed between the rotary polyhedral mirror and the surface to be scanned and separates light beams.

29. The optical scanner according to claim 28,
wherein the light separator is formed of a prism.

30. The optical scanner according to claim 28,
wherein the light combining member is formed of a dichroic mirror.

31. The optical scanner according to claim 28,
wherein the curved surface mirror causes a scanning line curvature in a direction that allows a scanning line curvature caused in the light separator to be corrected.

32. The optical scanner according to claim 29,
wherein the number of the light sources is two, the light sources being of different wavelengths,
where the wavelengths of the light sources are indicated respectively as $\lambda 1$ and $\lambda 2$,
an angle formed between an incidence surface and an emitting surface of the prism is indicated as $\theta pz$,
a distance from the emitting surface of the prism to an image plane on an optical path at the wavelength $\lambda 1$ is indicated as Dp, a refractive index of a material constituting the prism at the wavelength $\lambda 1$ is indicated as n1, a refractive index of the material at the wavelength $\lambda 2$ is indicated as n2, and
a spacing in the sub scanning direction between positions at a scanning center, on which light beams having the respective wavelengths are focused, respectively, is indicated as xd,
the optical scanner satisfies a relational expression $$Dp \cdot \cos(\theta A)\{\tan(\theta B) - \tan(\theta A)\} < xd, \text{ and}$$

in the relational expression, $$\theta A = \sin^{-1}\{n1 \cdot \sin(\theta pz)\} - \theta pz, \text{ and}$$

$$\theta B = \sin^{-1}\{n2 \cdot \sin(\theta pz)\} - \theta pz.$$

33. The optical scanner according to claim 1,
wherein the number of the light sources is two or higher, the light sources being of different wavelengths, and the optical scanner further comprises a light combining member that is disposed between the light source and the rotary polyhedral mirror and combines light beams from the light sources on a common axis, and a flat-shaped light separator that is disposed between the rotary polyhedral mirror and the surface to be scanned and separates light beams.

34. The optical scanner according to claim 33, wherein the light combining member is formed of a dichroic mirror.

35. The optical scanner according to claim 33, wherein the flat-shaped light separator is formed of a dichroic mirror.

36. The optical scanner according to claim 33, wherein the flat-shaped light separator is formed of a diffracting element.

37. The optical scanner according to claim 1, wherein the number of the light sources is three or higher, the light sources being of different wavelengths, the optical scanner further comprises a light combining member that is disposed between the light source and the rotary polyhedral mirror and combines light beams from the light sources on a common axis, and the light beams corresponding to the wavelengths are focused on a common axis on the surface to be scanned.

38. The optical scanner according to claim 37, wherein the light source is a laser light source that emits a light beam having a wavelength corresponding to any of three primary colors or complementary colors of the three primary colors.

39. The optical scanner according to claim 38, wherein the light source is formed of a semiconductor laser.

40. The optical scanner according to claim 37, wherein each of the light sources is a laser light source and includes a wavelength converting element so that the wavelength converting elements correspond respectively to the light sources.

41. The optical scanner according to claim 40, wherein the light source is formed of a semiconductor laser.

42. The optical scanner according to claim 37, wherein each of the light sources is a laser light source and includes a wavelength converting element and an acousto-optic modulating element so that the wavelength converting elements and the acousto-optic modulating elements conform respectively to the light sources.

43. The optical scanner according to claim 37, wherein the surface to be scanned is formed of a photographic paper sheet.

44. The optical scanner according to claim 1, wherein with respect to coordinates (x, y) defined by a coordinate x (mm) in the sub scanning direction and a coordinate y (mm) in the main scanning direction with a vertex of a surface of the curved surface mirror as an origin point,
where a direction in which a reflected light beam is directed is defined as a positive direction, the curved surface mirror has the surface of a shape having a sag amount z (mm) from the vertex represented by a relational expression:

$$Z = f(y) + \frac{\frac{X^2}{g(y)} - 2X \cdot \sin\{\theta(y)\}}{\cos\{\theta(y)\} + \sqrt{\cos^2\{\theta(y)\} - \left[\frac{x}{g(y)}\right]^2 + \frac{2X \cdot \sin\{\theta(y)\}}{g(y)}}}$$

in the above-mentioned relational expression,
f(y) is an expression defining a non-circular arc shape on a generatrix and is represented by $$f(y) = \frac{\left[\frac{y^2}{RDy}\right]}{1 + \sqrt{1 - (1+k)\left[\frac{y}{RDy}\right]^2}} + ADy^4 + AEy^6 + AFy^8 + AGy^{10}$$

where a radius of curvature in the main scanning direction at the vertex is indicated as RDy (mm), and constants of a high order defining a shape of the generatrix are indicated as AD, AE, AF and AG,
g(y) indicating a radius of curvature in the sub scanning direction (x-direction) at a position defined by the coordinate y is represented by $$g(y) = RDx(1 + BCy^2 + BDy^4 + BEy^6 + BFy^8 + BGy^{10})$$

where a radius of curvature in the sub scanning direction is indicated as RDx (mm), and constants determining the radius of curvature in the sub scanning direction at the position defined by the coordinate y are indicated as BC, BD, BE, BF and BG, and
θ(y) is an expression indicating a torsion amount at the position defined by the coordinate y and is represented by $$\theta(y) = ECy^2 + EDy^4 + EEy^6$$

where torsion constants determining the torsion amount at the position defined by the coordinate y are indicated as EC, ED and EE.

45. The optical scanner according to claim 1, wherein the number of the reflecting surfaces of the rotary polyhedral mirror is 10 to 20.

46. An image reading apparatus comprising an optical scanner as claimed in claim 1.

47. An image forming apparatus comprising an optical scanner as claimed in claim 1.

48. A photographic processing apparatus comprising an optical scanner as claimed in claim 37.

* * * * *